United States Patent
Sethi et al.

(10) Patent No.: US 10,140,472 B2
(45) Date of Patent: Nov. 27, 2018

(54) MULTI-LEVEL PRIVACY EVALUATION

(71) Applicant: Facebook, Inc., Menlo Park, CA (US)

(72) Inventors: Bhupinder Singh Sethi, Redmond, WA (US); Shiyu Zhao, Mountlake Terrace, WA (US); Yang Xia, Santa Clara, CA (US)

(73) Assignee: Facebook, Inc., Menlo Park, CA (US)

( * ) Notice: Subject to any disclaimer, the term of this patent is extended or adjusted under 35 U.S.C. 154(b) by 15 days.

(21) Appl. No.: 15/248,615

(22) Filed: Aug. 26, 2016

(65) Prior Publication Data

US 2016/0364581 A1    Dec. 15, 2016

Related U.S. Application Data

(63) Continuation of application No. 14/274,460, filed on May 9, 2014, now Pat. No. 9,460,308.

(51) Int. Cl.
*H04L 29/06* (2006.01)
*G06F 21/62* (2013.01)

(52) U.S. Cl.
CPC ...... *G06F 21/6245* (2013.01); *G06F 21/6218* (2013.01)

(58) Field of Classification Search
CPC ............ G06F 21/6245; G06F 21/6218; G06F 21/6263; H04L 63/105; H04L 63/0227; H04W 12/02; G06Q 50/00
USPC .......................................................... 726/28
See application file for complete search history.

(56) References Cited

U.S. PATENT DOCUMENTS

| | | |
|---|---|---|
| 6,330,610 B1 | 12/2001 | Docter et al. |
| 6,704,719 B1 | 3/2004 | Ericson et al. |
| 7,853,786 B1 * | 12/2010 | Fultz ............... H04L 63/102 713/155 |
| 8,180,786 B2 | 5/2012 | Veanes et al. |
| 8,250,008 B1 | 8/2012 | Cao et al. |
| 8,407,789 B1 | 3/2013 | Mears et al. |
| 8,417,654 B1 | 4/2013 | Cao et al. |
| 8,478,707 B1 | 7/2013 | Ong et al. |

(Continued)

OTHER PUBLICATIONS

Advisory Action dated Dec. 30, 2016 for U.S. Appl. No. 14/152,109 by Yung, R. et al., filed Jan. 10, 2014.

(Continued)

*Primary Examiner* — Yogesh Paliwal
(74) *Attorney, Agent, or Firm* — Baker Botts L.L.P.

(57) ABSTRACT

An multi-level privacy evaluation technology is described for increasing the performance of applications or services that experience high volumes of queries for data with privacy attributes. The multi-level privacy evaluation technology evaluates data using a subset of privacy policy rules and privacy information determined for the data at a backend server and thereby reduces the volume of data that need to be filtered at a frontend server. The multi-level privacy evaluation technology first applies an initial privacy check on a large data set at the backend to authoritatively filter out any data that a viewing user is not permitted to view or access and return as results a smaller data set that the viewing user may be permitted to view or access. A full privacy check is then performed at the frontend on the smaller data set, resulting in reduction in the overall cost of performing privacy checks and reducing latency in displaying data to the viewing user.

19 Claims, 16 Drawing Sheets

(56) References Cited

U.S. PATENT DOCUMENTS

| | | | |
|---|---|---|---|
| 9,009,780 | B2 | 4/2015 | Heise et al. |
| 9,069,856 | B1* | 6/2015 | Lilot .................. G06F 17/30864 |
| 9,276,960 | B2 | 3/2016 | Pimenova et al. |
| 9,432,053 | B1 | 8/2016 | Graumann et al. |
| 9,460,308 | B2 | 10/2016 | Zhao et al. |
| 2006/0200333 | A1 | 9/2006 | Dalal et al. |
| 2007/0055658 | A1 | 3/2007 | Hsiao et al. |
| 2007/0074188 | A1 | 3/2007 | Huang et al. |
| 2007/0150429 | A1 | 6/2007 | Huelsman et al. |
| 2009/0045971 | A1 | 2/2009 | Simons et al. |
| 2009/0193493 | A1 | 7/2009 | Becker et al. |
| 2009/0222393 | A1 | 9/2009 | Ganai |
| 2009/0254638 | A1 | 10/2009 | Spatscheck et al. |
| 2009/0265296 | A1 | 10/2009 | Nairain et al. |
| 2009/0265319 | A1* | 10/2009 | Lehrman ........... G06F 17/30867 |
| 2009/0326907 | A1 | 12/2009 | Gulwani et al. |
| 2010/0192130 | A1 | 7/2010 | Hawblitzel et al. |
| 2010/0306818 | A1 | 12/2010 | Li et al. |
| 2011/0246498 | A1 | 10/2011 | Forster et al. |
| 2012/0017260 | A1 | 1/2012 | Narain et al. |
| 2012/0192290 | A1 | 7/2012 | Barefoot et al. |
| 2012/0278700 | A1 | 11/2012 | Sullivan et al. |
| 2013/0198811 | A1* | 8/2013 | Yu ......................... H04L 63/104 726/4 |
| 2013/0212266 | A1 | 8/2013 | Lyon et al. |
| 2013/0283339 | A1 | 10/2013 | Biswas et al. |
| 2014/0006522 | A1 | 1/2014 | Syrowitz et al. |
| 2014/0282837 | A1 | 9/2014 | Heise et al. |
| 2015/0200816 | A1 | 7/2015 | Yung et al. |
| 2015/0288718 | A1 | 10/2015 | Pimenova et al. |
| 2015/0310225 | A1 | 10/2015 | Heise et al. |
| 2015/0324600 | A1 | 11/2015 | Sethi et al. |
| 2016/0028769 | A1 | 1/2016 | Hopkins et al. |
| 2016/0127377 | A1 | 5/2016 | Pimenova et al. |

OTHER PUBLICATIONS

Non-Final Office Action dated May 5, 2017, for U.S. Appl. No. 14/986,535 by Pimenova, M.S. et al., filed Dec. 31, 2015.
Non-Final Office Action dated Jul. 3, 2017, for U.S. Appl. No. 14/639,329, of Heise, S., et al., filed Mar. 5, 2015.
Non-Final Office Action dated Jul. 5, 2017, for U.S. Appl. No. 14/152,109 by Yung, R., et al., filed Jan. 10, 2014.
"Mohawk: A tool for verifying access-control policies", Retrieved from https://code.google.com/p/mohawk/ on Mar. 7, 2013, 1 page.
"Papers and Talks", Retrieved from https://sites.google.com/site/jeevesprogramming/applications on Mar. 7, 2013, 3 pages.
"Satisfiability Modulo Theories", Retrieved from http://en.wikipedia.org/wiki/Satisfiability_Modulo_Theories on Mar. 7, 2013, 7 pages.
"The Margrave Policy Analyzer", Retrieved from http://www.margrave-tool.org/ on Mar. 7, 2013, 2 pages.
Jayaraman et al., "Automatic Error Finding in Access-Control Policies", CCS'11, Oct. 17-21, 2011, 12 pages, ACM 978-1-4503-0948-6/11/10, Chicago, IL.
Non-Final Office Action dated Aug. 22, 2014, for U.S. Appl. No. 13/842,185 by Heise, S. et al., filed Mar. 15, 2013.
Non-Final Office Action dated Jun. 7, 2016, U.S. Appl. No. 14/639,329 by Heise, S. et al., filed Mar. 5, 2015.
Non-Final Office Action dated Dec. 3, 2015 for U.S. Appl. No. 14/152,109 by Yung, R. et al., filed Jan. 10, 2014.
Non-Final Office Action dated May 10, 2016 for U.S. Appl. No. 14/152,109 by Yung, R. et al., filed Jan. 10, 2014.
Non-Final Office Action dated Feb. 26, 2016, for U.S. Appl. No. 14/274,460 by Sethi, B., et al., filed May 9, 2014.
Non-Final Office Action dated Jul. 14, 2015, for U.S. Appl. No. 14/243,167 by Pimenova, M.S. et al., filed Mar. 2, 2014.
Notice of Allowance dated Feb. 3, 2015, for U.S. Appl. No. 13/842,185 by Heise, S. et al., filed Mar. 15, 2013.
Notice of Allowance dated Oct. 23, 2015, for U.S. Appl. No. 14/243,167 by Pimenova, M.S. et al., filed Mar. 2, 2014.
Restriction Requirement dated Dec. 4, 2015, for U.S. Appl. No. 14/274,460 by Sethi, B., et al., filed May 9, 2014.
Swamy et al., "Secure Distributed Programming with Value-Dependent Types", ICFP'11, Sep. 19-21, 2011, 13 pages, ACM 978-1-4503-0865-6/11/09, Tokyo, Japan.
U.S. Appl. No. 13/842,185 by Heise, S. et al., filed Mar. 15, 2013.
U.S. Appl. No. 14/152,109 by Yung, R. et al., filed Jan. 10, 2014.
U.S. Appl. No. 14/243,167 by Pimenova, M. et al., filed Apr. 2, 2014.
U.S. Appl. No. 14/274,460 by Sethi, B. et al., filed May 9, 2014.
U.S. Appl. No. 14/341,028 by Hopkins, K. et al., filed Jul. 25, 2014.
U.S. Appl. No. 14/986,535 by Pimenova, M. et al., filed Dec. 31, 2015.
U.S. Appl. No. 14/639,329 by Heise, S. et al., filed Mar. 5, 2015.
Yang et al., "A Language for Automatically Enforcing Privacy Policies", POPL'12, Jan. 25-27, 2012, 12 pages, ACM 978-1-4503-1083-3/12/01, Philadelphia, PA.
Yang et al., "A Language for Automatically Enforcing Privacy", 31 pages, POPL/CSAIL.
Yang et al., "A Language for Automatically Enforcing Privacy", Talk given on Jul. 27, 2011, 42 pages, Google NYC/CSAIL, New York, NY.
Yang et al., "A Language for Automatically Enforcing Privacy", Talk given on Mar. 28, 2012, 56 pages, Jeeves/CSAIL.
Yang et al., "Safe to the Last Instruction: Automated Verification of a Type-Safe Operating System", PLDI'10, Jun. 5-10, 2010, 12 pages, ACM 978-1-4503-0019/10/06, Toronto, Ontario, Canada.
Notice of Allowance dated Jun. 22, 2016, for U.S. Appl. No. 14/274,460 by Sethi, B., et al., filed May 9, 2014.
Final Office Action dated Dec. 5, 2016 for U.S. Appl. No. 14/639,329 by Heise, S. et al., filed Mar. 5, 2015.
Final Office Action dated Oct. 12, 2016 for U.S. Appl. No. 14/152,109 by Yung, R. et al., filed Jan. 10, 2014.
Corrected Notice of Allowability dated Dec. 21, 2017 for U.S. Appl. No. 14/986,535 by Pimenova, M. et al., filed Dec. 31, 2015.
Notice of Allowance dated Dec. 6, 2017 for U.S. Appl. No. 14/986,535 by Pimenova, M. et al., filed Dec. 31, 2015.
Notice of Allowance dated Nov. 22, 2017 for U.S. Appl. No. 14/152,109 by Yung, R. et al., filed Jan. 10, 2014.

* cited by examiner

MULTI-LEVEL PRIVACY EVALUATION

CROSS-REFERENCE TO RELATED APPLICATIONS

This application is a divisional application of U.S. patent application Ser. No. 14/274,460, filed on May 9, 2014, entitled "MULTI-LEVEL PRIVACY EVALUATION", which is incorporated herein by reference in its entirety.

BACKGROUND

Various websites and applications enable users to control public or private settings for content. For example, a social networking application enables users to set a privacy setting for almost every "entity" relating to the application including, e.g., photos, videos, statuses, timeline/wall posts, etc. Consider an example where a user "Joe" of a social networking application attempts to view photos of another user "Jane." Jane's photos can have different privacy settings to indicate whether all users can view the photos or only some users (e.g., public, friends, custom), and Jane can change those settings at any time. An authorization engine typically aggregates all of Jane's photos and/or other data relating to the photos from the backend servers where the photos are persistently stored to the web frontend servers where a set of privacy policies and rules are defined and/or evaluated. The authorization engine then evaluates each of the photos based on the set of privacy policies and rules. So, if Jane has 1000 photos, all of the photos would be fetched from the backend servers and evaluated at the web frontend servers. However, if for instance only 10% of the photos turn out to be viewable by the user Joe, 90% of the resources may have been wasted in retrieving the photos that could not be viewed by the user Joe.

One way to reduce the resources wasted in retrieving raw data that is eventually discarded is by implementing the authorization engine in the backend servers. However, the privacy policies and rules used by the authorization engine can be fairly complex and are typically defined in a computer programming language that is different from the computer programming language used at the backend servers. For example, the privacy policies and rules may be coded in PHP, while the backend servers may use C++. Consequently, the backend authorization engine cannot directly leverage the PHP-based privacy policies and rules and would require re-implementation of the privacy policies and rules in a computer-programming language suitable for the backend system. This means that any change to the privacy policies and rules would need to be made twice, first at the frontend and then at the backend, which results in a waste of resources. Instead of implementing the privacy policies and rules at two locations, one solution is to have the backend authorization engine check with the frontend privacy policies and rules for making privacy checks. However, such an implementation is also not desirable since the backend calls to the frontend for multiple users can quickly become inefficient and consume additional resources.

DETAILED DESCRIPTION

Figure 1:
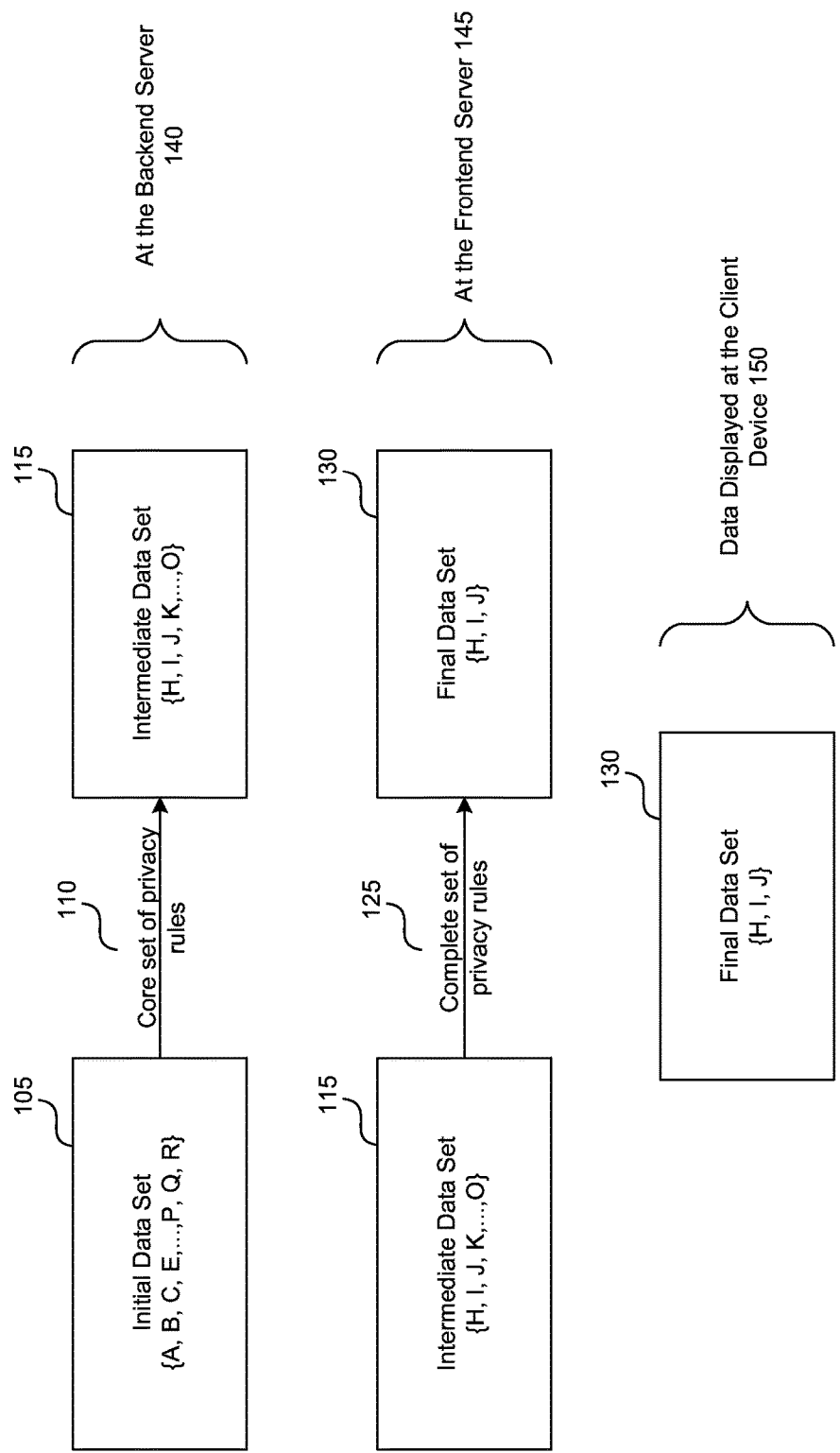
FIG. 1 is a block diagram illustrating an example of a multi-level privacy check including an initial privacy check and a full privacy check on data items in some embodiments of the multi-level privacy evaluation technology.

A multi-level privacy evaluation technology is disclosed for reducing the overall cost of performing complex privacy checks, reducing latency in displaying data to viewers and improving the performance of applications or services that experience high volumes of queries per second (QPS). In various embodiments, the multi-level privacy evaluation technology first applies an initial privacy check on a large set of data at one or more database servers ("backend servers") by evaluating the large set of data using a small set of privacy policies and rules. The application of the initial privacy check on the large set of data at the backend server filters out any data that a viewer is definitely not permitted to view or access based on the small set of privacy policies and rules and returns as result a reduced set of data for further evaluation by one or more web servers ("frontend servers"). The multi-level privacy evaluation technology then applies a full or accurate privacy check on the reduced set of data by evaluating the reduced set of data using a larger or more complex set of privacy policies and rules. The application of the full privacy check on the reduced set of data at the frontend server provides a decision regarding which data from the reduced set of data are viewable or accessible by the viewer. The data that is authoritatively determined to be viewable or accessible by the viewer is then returned to the viewer. Thus, the backend server performs an initial coarse-grained evaluation using a subset of rules to remove much of the data that is not relevant before the data is transmitted to the frontend server to perform a fine-grained check with a full set of rules.

In some embodiments, the multi-level privacy evaluation technology periodically validates effectiveness of the initial privacy check by returning a portion of the filtered data as validation data to the frontend server. The frontend server performs a full privacy check on the validation data to identify any data items that were incorrectly filtered out at the backend server and logs such incorrectly filtered data items so that the rules for evaluation at the backend server can be improved.

The multi-level privacy evaluation technology is applicable to many high QPS applications or services where each query can involve complex privacy checks on data items. One example of a high QPS service is a "newsfeed" type service in social networking applications. The newsfeed service identifies recent stories by various users (e.g., friends) for display on a viewer's landing page and performs a privacy check on each identified story to determine if the story should be included or excluded for viewing by the viewer. Examples of stories include actions such as comments, "likes," etc., and objects such as status, photo, share, checkin, etc. When the backend server providing the newsfeed service receives a request, the backend server queries various computing nodes where the stories related to the viewer and the viewer's friends are stored. Instead of ranking all the aggregated stories and returning them to the frontend server, the multi-level privacy evaluation technology applies the initial privacy check on the aggregated stories to filter more of the stories that the viewer is not allowed to view at the backend server. As a result, fewer frontend invalidations are needed, e.g., for objects such as statuses and shares. This also reduces the CPU resources for ranking the aggregated items, both at the frontend server and the backend server.

Another example of a high QPS service is a search engine that indexes data items having different privacy values. Such a search engine can be implemented by applications, e.g., social networking applications, to accept search queries for data items such as photos, posts, etc., from users and return as responses data items that are relevant to the search queries and are consistent with the privacy information associated with the data items. When a backend server implementing the search engine receives a search query, the multi-level privacy evaluation technology automatically filters out stories that do not pass the initial privacy check at the backend server via a query rewriting method. By applying the initial privacy check at the backend server, the multi-level privacy evaluation technology filters out stories that would not pass the initial privacy check, which reduces "privacy-invalid" stories from being returned from the backend server. As a result, the frontend invalidation rate is improved, which in turn decreases search latency as privacy invalidation is typically a slow process.

Yet another example of a high QPS service is a "timeline" type service that displays a user's profile comprising a collection of stories (e.g., posts, shares, photos, etc.) in a chronological order. Any request from a viewer to view data items associated with a user's timeline involves a privacy check of each data item to ensure that the viewer can see only those items that pass the privacy check. For example, if a user's photo has a privacy value "friends," the privacy check can determine whether the viewer is: (1) a "friend" of the user, (2) tagged on the photo, or (3) friend of the tagged user. If any of these conditions is true, the photo passes the privacy check and can be displayed to the viewer. Otherwise, the photo may be prevented from being displayed.

In various embodiments, the multi-level privacy evaluation technology improves the performance of these services or applications by bucketing stories based on their approximate audience. In other words, the multi-level privacy evaluation technology stores data items suitable for viewers who qualify as "public" separately from data items suitable for viewers who qualify as "friends-or-less." Consequently, when a public viewer requests to see data items associated with a user, instead of returning all data items associated with the user to the frontend, many of which may be suitable for viewers who qualify as "friends," the multi-level privacy evaluation technology serves data items from the public bucket to the public viewer. This reduces latency for the public viewer, as data items that are unsuitable for the public viewer are pre-filtered out from the response. Moreover, the technology also improves the ranking and CPU efficiency since "public" data items do not have to compete with "friends-or-less" data items which can easily result in the "public" data items getting outranked and thus never reaching the public viewer.

Various embodiments and implementations of the multi-level privacy evaluation technology will now be described. The following description provides specific details for a thorough understanding and an enabling description of these implementations. One skilled in the art will understand, however, that the disclosed system and methods may be practiced without many of these details. Additionally, some well-known structures or functions may not be shown or described in detail, so as to avoid unnecessarily obscuring the relevant description of the various implementations. The terminology used in the description presented below is intended to be interpreted in its broadest reasonable manner, even though it is being used in conjunction with a detailed description of certain specific implementations of the disclosed system and methods.

FIG. 1 is a block diagram illustrating an example of a multi-level privacy check on data items in some embodiments of the multi-level privacy evaluation technology.

Consider an example of a viewer submitting a search query for photos relating to the "Grand Canyon." The initial data set 105 that includes a set of data items {A, B, C, E, . . . , P, Q, R} can include all the photos relating to the "Grand Canyon." Each of these data items can have a privacy setting associated with it, providing an indication of who the data item was shared up to by the data item owner. For example, data item H may be "public," indicating that the data item was shared with everyone; data item I may be "friends," indicating that the data item was shared by the data item owner with his or her friends; data item J may be "only me," indicating that the data item was not shared with anyone; and data item O can be "friends except Joe and Jane," indicating that the data item was shared with all the data item owner's friends except Joe and Jane. Instead of storing the actual privacy information which can exceed 100 or 200 bytes per data item, the backend server stores a simplified or condensed form of the privacy information ("privacy information" or "privacy payload" or "privacy value") that can be much smaller in size (e.g., ~30-40 bytes) but includes enough information to allow the data items to be evaluated using a core set of rules 110. In the above example, the privacy information for each of the data items H, I and J remain "public," "friends" and "only me," respectively while the privacy information for data item O can be approximated or condensed from "friends except Joe and Jane" to "friends."

The multi-level privacy evaluation technology performs an initial privacy check by applying a core set of privacy rules 110 on the initial data set 105 to obtain an intermediate data set 115 at the backend server 140. The intermediate data set 115 includes a set of data items {H, I, J, K, . . . , O} that passed the initial privacy check, but may or may not be viewable by the viewer. The intermediate data set 115 excludes data items that are positively not viewable by the viewer as determined based on evaluation of the core set of privacy rules. Following are examples of the core set of privacy rules 110 that can be evaluated to obtain the intermediate data set 115.

Rule 1: A data item is viewable by the viewer if the data item has a privacy value of "public."

Rule 2: A data item is viewable by the viewer if the data item has a privacy value of "only me" and the viewer is also the data item owner.

Rule 3: A data item is viewable by the viewer if the data item has a privacy value of "only me" and the viewer is tagged on the data item.

Rule 4: A data item is viewable by the viewer if the data item has a privacy value of "friends" and the viewer and the data item owner are friends.

RULE 5: A data item is viewable by the viewer if the data item has a privacy value of "friends" and any one of the viewer's friend is tagged on the data item.

More or less rules may be used in evaluating the initial privacy at the backend. For example, one rule can check if a data item is a group post and allow a viewer to view the data item if the viewer is a member of the group post and the group post is private.

The intermediate data set 115 is returned to the frontend server 145 for a full privacy check. The frontend server, based on a set of privacy rules 125, filters out data items that should not be viewable by the viewer. The remaining data items in the final data set 130 that passed the full privacy check are returned to the viewer. At the client device 150, the viewer can view the data items 130 that have passed both the initial privacy and full privacy checks.

Figure 2:
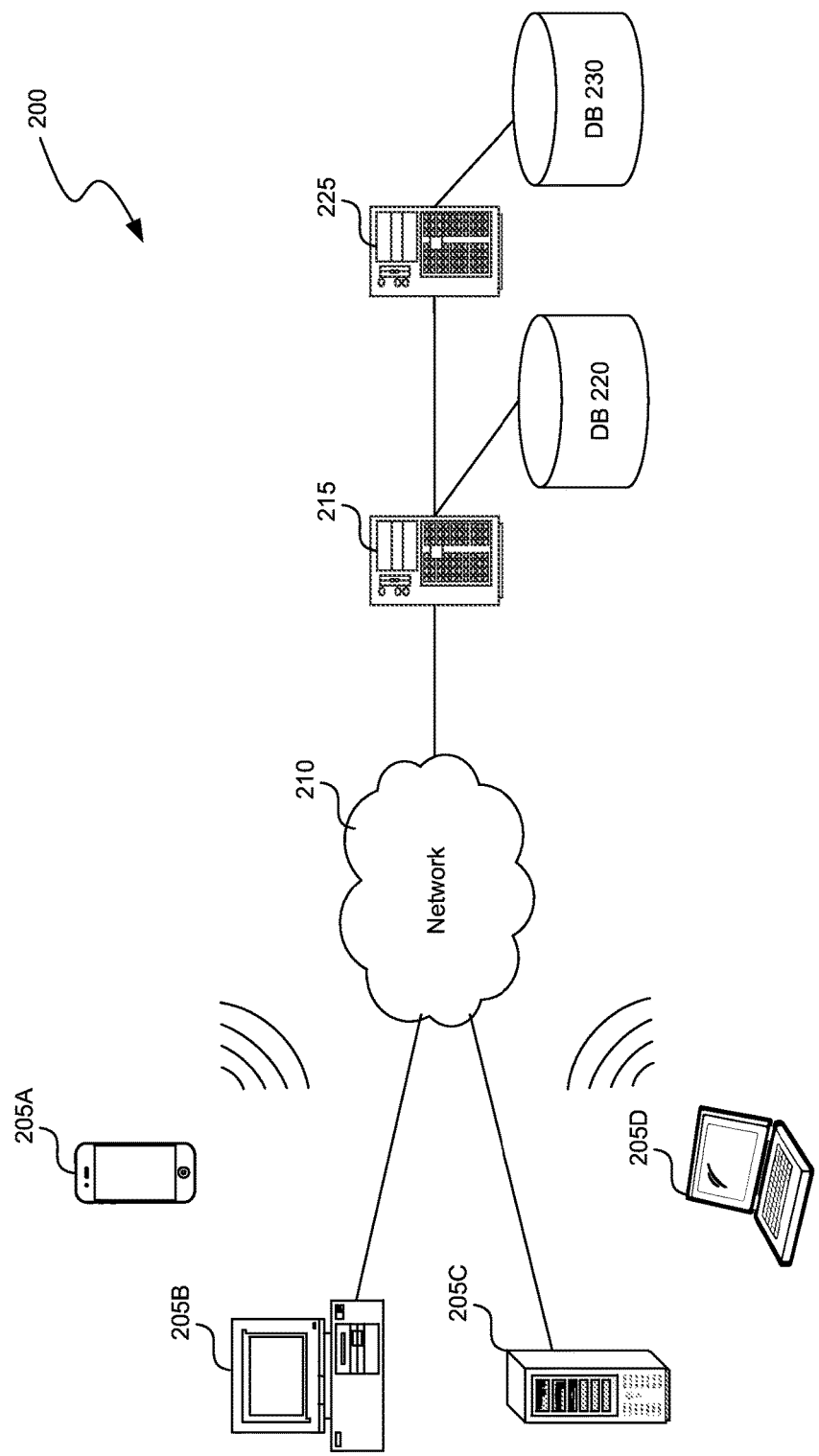
FIG. 2 is a block diagram illustrating an overview of an environment in which some embodiments of the multi-level privacy evaluation technology may operate.

FIG. 2 is a block diagram illustrating an overview of an environment 200 in which some embodiments of the multi-level privacy evaluation technology may operate. The environment 200 for implementing the technology may include one or more client computing devices 205A-D, examples of which may include the computer system 1000. Client computing devices 205A-D may operate in a networked environment using logical connections to one or more remote computers or server computing devices that comprise the web tier, collectively referred to herein as the frontend server 215 through network 210. The frontend server 215 can connect to one or more database servers such as the backend server 225. In various embodiments, the backend server architecture may be different. For example, the backend server for newsfeed type service can include multiple leaf servers where data items are stored and one or more aggregator servers that perform the aggregation of data items from the leaf servers and apply the initial privacy check on the aggregated data items. By way of another example, the backend server for a search engine can include a search tier comprising multiple index servers and one or more aggregator servers that issue the queries and aggregate responses to the queries. By way of yet another example, the backend server for a timeline type service can include one or more databases where data items relating to the service are stored and one or more aggregator servers that aggregate data items retrieved from the one or more databases. As described above, each of the frontend server 215 and the backend server 225 can be coupled to one or more databases. The database 220 associated with the frontend server may include one or more database tables storing information such as policies and rules for the full privacy check, privacy information for data items, and/or the like. The database 230 associated with the backend server 225 can include one or more database tables storing information such as data items, privacy values, initial privacy rules, and/or the like.

It should be noted that the term "server" as used throughout this application refers generally to a computer, other device, program, or combination thereof that processes and responds to the requests (e.g., from remote users using client devices across a network, from other servers). Servers serve their information to requesting "clients." The term "client" as used herein refers generally to a computer, program, other device, user and/or combination thereof that is capable of processing and making requests and obtaining and processing any responses from servers across a network. Client computing devices 205A-D and server computing devices 215, 225 may each act as a server or client to other server/client devices. Network 210 can be a local area network (LAN) or a wide area network (WAN), but may also be other wired or wireless networks. The client computing devices 205A-D can be connected to network 210 through a network interface, such as by a wired or wireless network.

Figure 3A:
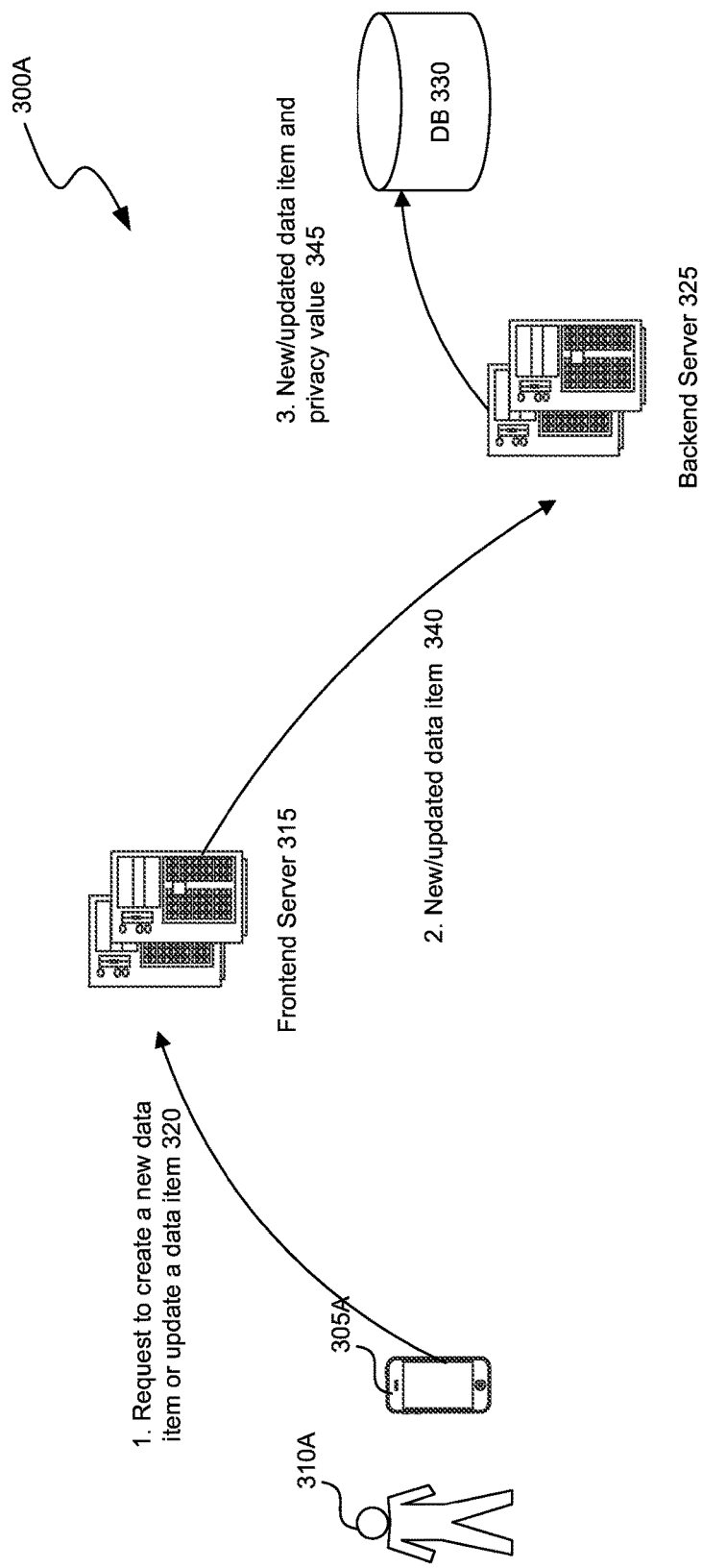
FIG. 3A is a data flow diagram illustrating an example writing and updating of a privacy value of a data item in some embodiments of the multi-level privacy evaluation technology.

The data flow diagram of FIG. 3A illustrates an example writing and updating of a privacy value of a data item in some embodiments of the multi-level privacy evaluation technology. In the data flow diagram 300A, a user 310A using a client device 305A sends a request 320 that creates a new data item or updates an existing data item. Examples of data items can include, but are not limited to objects such as comments, statuses, shares, photos, checkins, and/or the like. A frontend server 315 receives the request and pushes the new/updated data item 340 to a backend server 325. Whenever a data item is created or updated, the backend server 325 calculates the privacy value for the new/updated data item. The new/updated data item and the calculated privacy value for the data item 345 are then stored by the backend server 325 (e.g., on a leaf server 330). Alternately, in some embodiments, the privacy value for the new/updated data item can be calculated at the frontend server and pushed to the backend server along with the new/updated data item for storage.

Figure 3B:
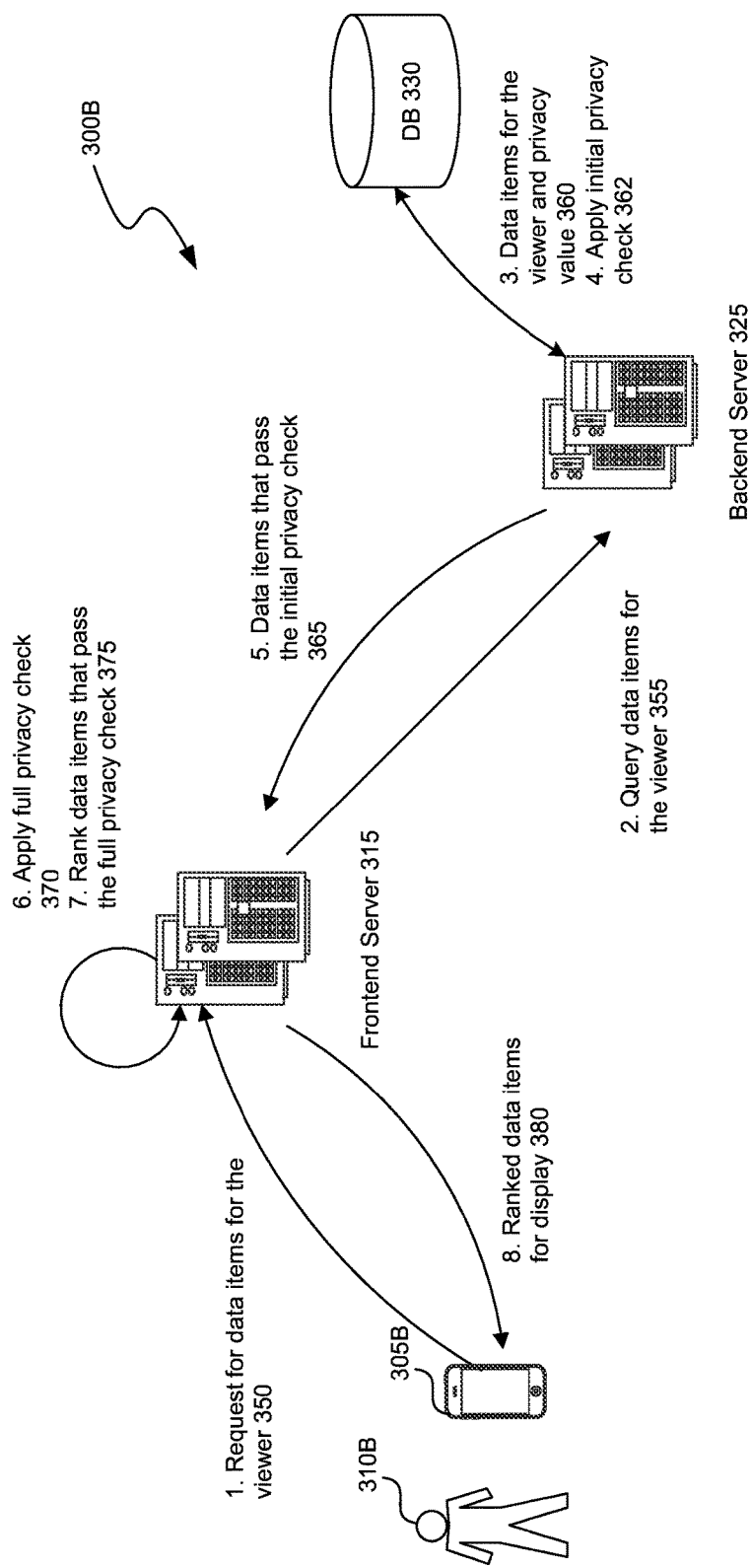
FIG. 3B is a data flow diagram illustrating an identification of data items for a viewer in some embodiments of the multi-level privacy evaluation technology.

The data flow diagram of FIG. 3B illustrates identification of data items for a viewer 310B in some embodiments of the multi-level privacy evaluation technology. Such data items can be identified, for example, for display on a landing page or a news or data feed associated with a social networking application. The identification of the data items involves performing an initial privacy check at the backend server which ensures that more data items are filtered in the backend, thereby enabling the frontend server to perform the more computationally expensive full privacy check on a reduced set of data items.

In the data flow diagram 300B, a client device 305B sends a request 350 for data items for the viewer 310B. The frontend server 315 receives the request from the client device and sends a query request 355 for data items for the viewer 310B to the backend server 325. The query request can include, for example, an identifier (ID) of the viewer 310B. The backend server 325 receives the query request 355 and in response aggregates data items for the viewer 310B and the privacy values of the data items. The backend server can query one or more nodes (e.g., database 330) where the data items may be stored to aggregate the data items. The backend server then evaluates the privacy of each of the aggregated data items via a process 362. The backend server can utilize a data item's privacy value, the data item's owner ID, the viewer ID and the viewer's friends' IDs to determine whether the data item should be filtered out. The data items 365 that pass the initial privacy check (i.e., the data items that are not filtered out) are returned by the backend server to the frontend server 315. The frontend server 315 then applies a full privacy check on the returned data items via process 370 to filter out any data items that the viewer 310B cannot view. The data items that are not filtered out (i.e., the data items that pass the full privacy check) are ranked via a process 375 and the ranked data items are returned as results 380 to the client device 305B. Each of the processes in the data flow diagram 300B are described in detail in relation to FIGS. 7A and 7B.

Figure 4:
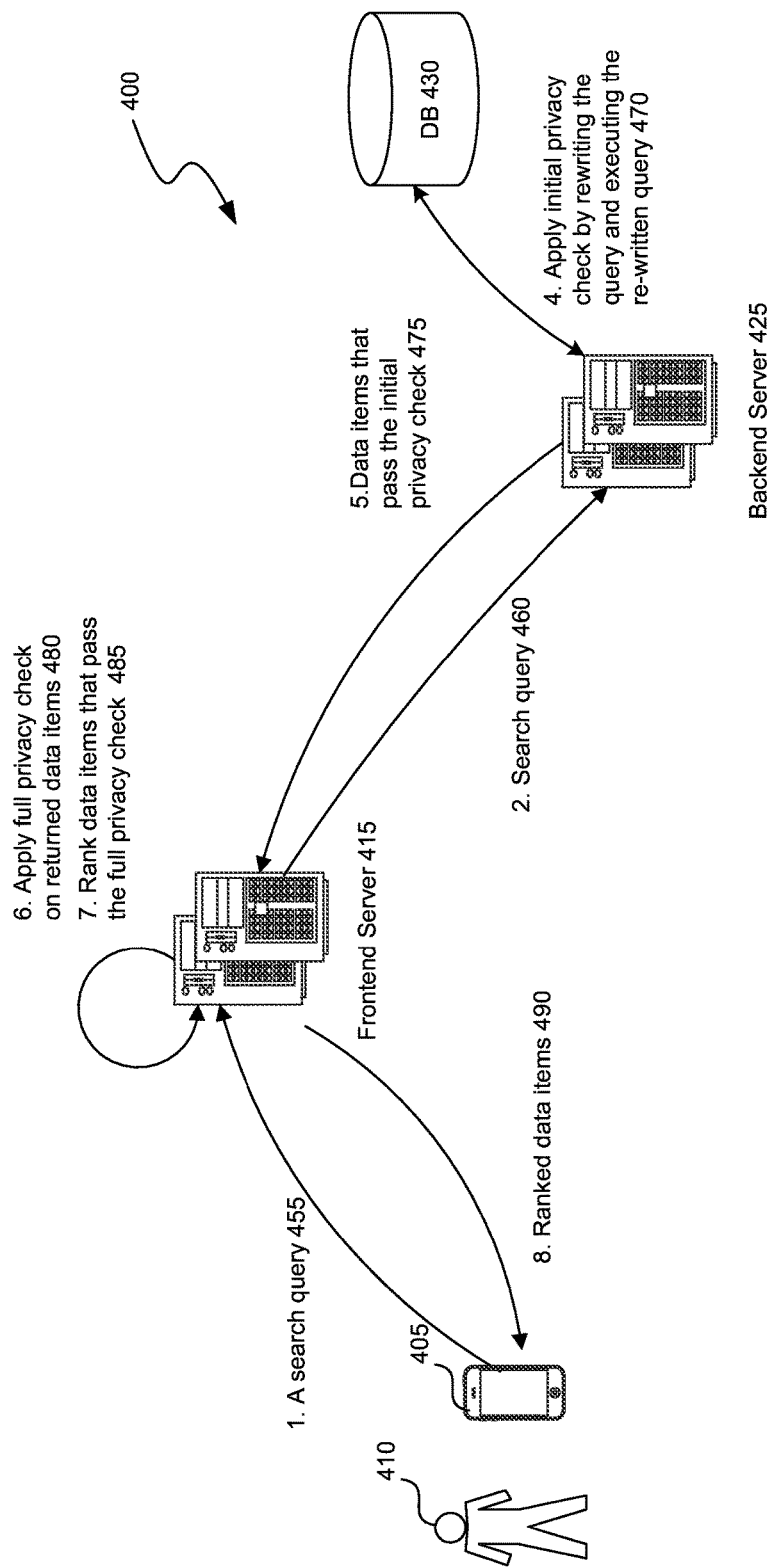
FIG. 4 is a data flow diagram illustrating processing of a search query in some embodiments of the multi-level privacy evaluation technology.

FIG. 4 is a data flow diagram illustrating processing of a search query in some embodiments of the multi-level privacy evaluation technology.

In the data flow diagram 400, a backend server 425 can implement a search engine that queries a search index 430. The search index 430 can be populated with search migrators or crawlers that regularly crawl and generate the search index. Whenever a data item is created (e.g., a photo is uploaded) or updated (e.g., another user is tagged to the photo), the corresponding migrators are called to update the search index 430. Updating the search index can include, for example, computing a privacy value for the data item and storing that value in the search index along with the data item. As described above, the privacy value can be calculated using one or more functions in the privacy library. In this embodiment, input parameters such as privacy information and tagging information can be passed into the privacy library to obtain the privacy value.

In the data flow diagram 400, a search query 455 is received from a client device 405 of a viewer 410 at the frontend server 415. The frontend server 415 forwards the search query 460 to the backend server. When the search query arrives at the backend, the backend server 425 applies an initial privacy check on data items stored in the search index via a process 470. The backend server 425 rewrites the search query to include as search parameters privacy information and tagging information to effectively filter out any data items based on the privacy information and tagging information. The data items 475 that pass the initial privacy check (i.e., the data items matching the rewritten query) are returned from the backend server 425 to the frontend server 415. The frontend server 415 then applies a full privacy check on the returned data items via a process 480 and ranks data items that pass the full privacy check via a process 485. The ranked data items 490 are then transmitted to the client device 405 as a response to the search query 455. Each of the processes in the data flow diagram are described in detail in relation to FIG. 8B.

Figure 5A:
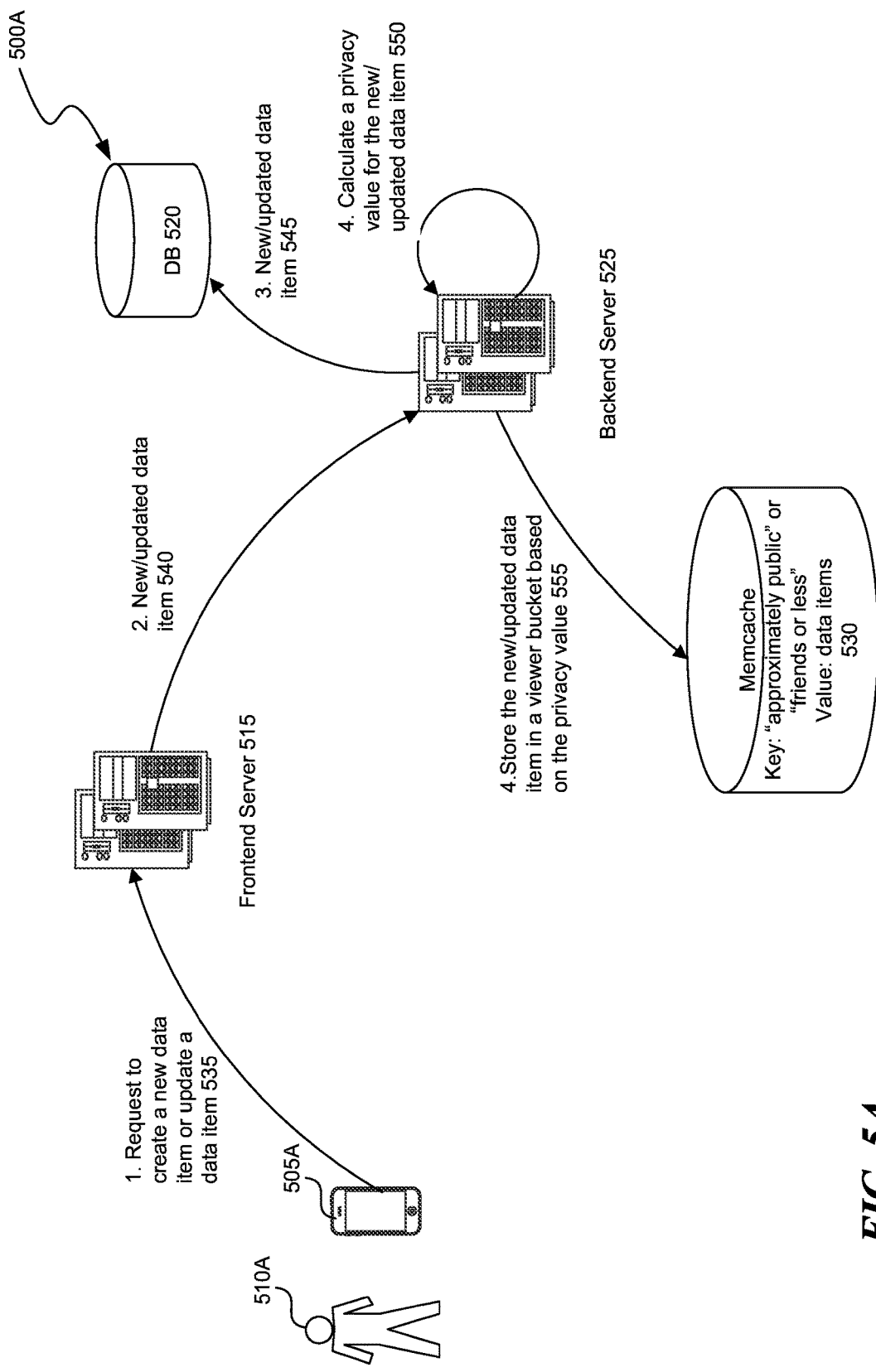
FIG. 5A is a data flow diagram illustrating writing and updating of data items in some embodiments of the multi-level privacy evaluation technology.

Referring to FIG. 5A, the data flow diagram 500A illustrates writing and updating of data items in some embodiments of the multi-level privacy evaluation technology. In the data flow diagram 500A, a client device 505A associated with a user 510A sends a request 535 that creates a data item or updates a data item to a frontend server 515. The frontend server 515 receives the request and forwards the new/updated data item 540 to a backend server 525 for storage. The backend server 525 stores the new/updated data item 545 in the database 520. The backend server 525 (e.g., using a wormhole client) listens on data items, e.g., statuses, posts, shares, checkins, videos, photos, etc., and whenever any new data item or data item update is detected, calculates a privacy value for the data item using the privacy library via a process 550. In this embodiment of the multi-level privacy evaluation technology, the backend server 525 uses the privacy value of the data item to place the data item in an appropriate viewer bucket. For example, data items that have "friends" as the privacy value can be assigned to the "friends-or-less" viewer bucket, while data items that have "public" as the privacy value can be assigned to the "approximately public" viewer bucket. The backend server 525 then ranks the data items within each viewer bucket and stores the data items along with the ranking information 555 in a memcache 530, under different sets of memcache keys. Each of the processes in the data flow diagram 500B are described in detail in relation to FIG. 9A.

Figure 5B:
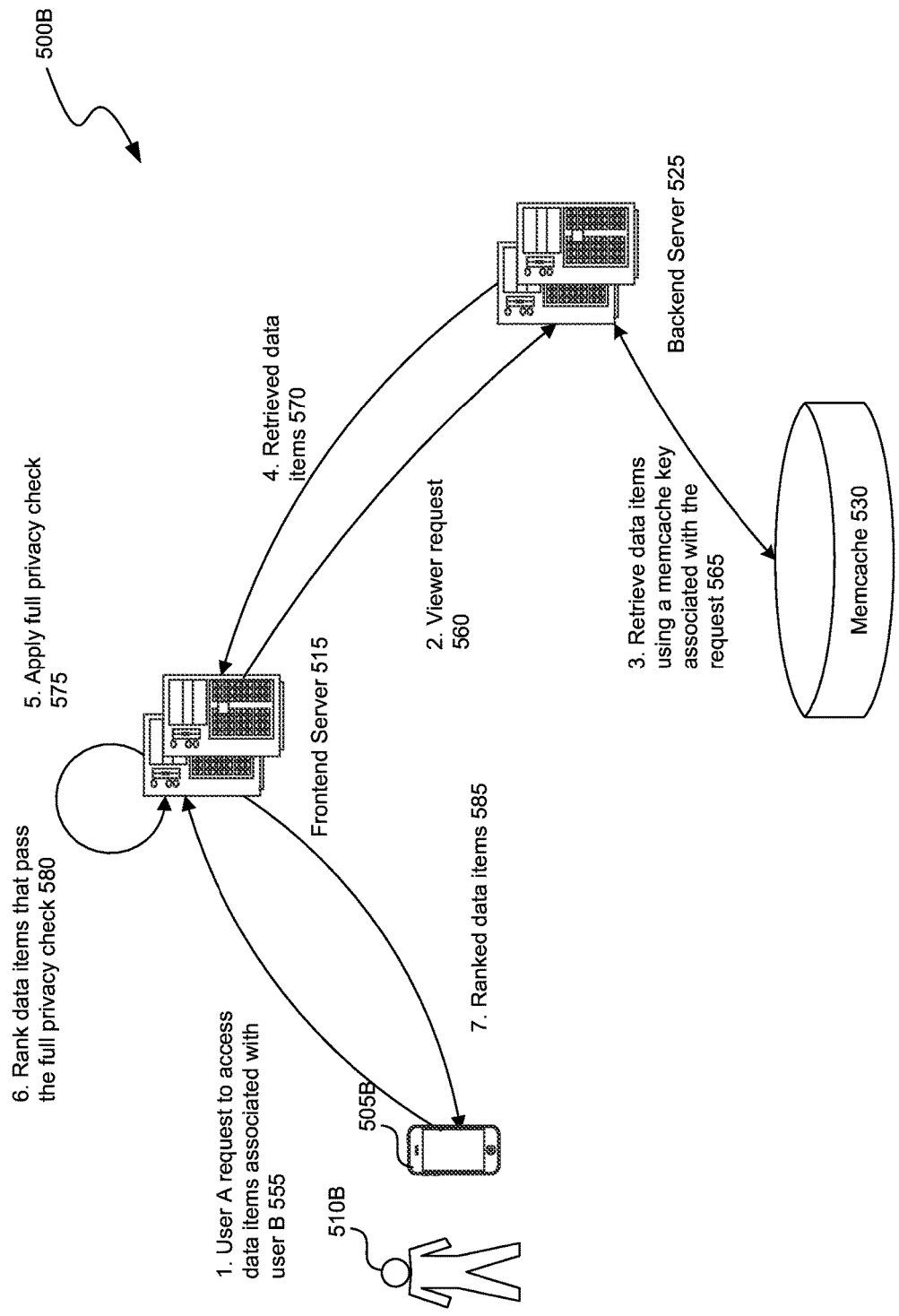
FIG. 5B is a data flow diagram illustrating processing of a request from a viewer to view data items associated with a user in some embodiments of the multi-level privacy evaluation technology.

FIG. 5B is a data flow diagram 500B illustrating processing of a request from a viewer to view data items associated with a user in some embodiments of the multi-level privacy evaluation technology.

In the data flow diagram 500B, a viewer 510B submits a request to view data items associated with a user using a client device 505B. The submitted request 555 is received at a frontend server 515, which then forwards the request 560 to a backend server 525. The request 560 can include, for example, the viewer ID and the user ID. If the viewer is a public viewer, the backend server retrieves the data items (or values) stored with "approximately public" memcache keys from the memcache key-value store 530. If the viewer is a friend, the backend server retrieves the data items stored with both "approximately public" and "friends-or-less" memcache keys. The retrieved data items 570 are then sent to the frontend server which then applies the full privacy check on the retrieved data items via a process 575. The data items that pass the full privacy check are ranked via a process 580 and returned as ranked data items 585 to the client device 505B. Each of the processes in the data flow diagram 500B are described in detail in relation to FIG. 9B.

Figure 6A:
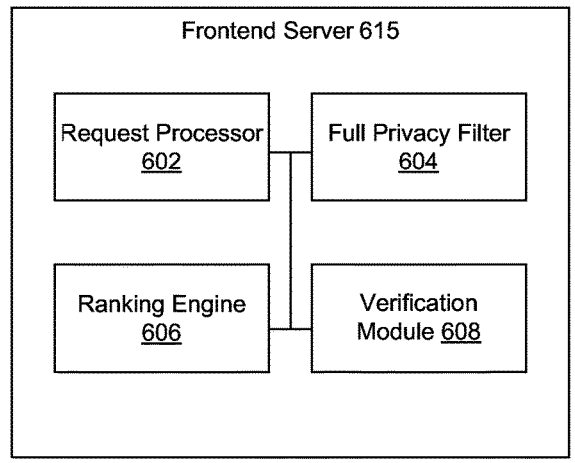
FIG. 6A is a block diagram illustrating example components of a frontend server in some embodiments of the multi-level privacy evaluation technology.

FIG. 6A is a block diagram illustrating example components of a frontend server 615 in some embodiments of the multi-level privacy evaluation technology. For instance, the frontend server 615 can include a request processor 602, a full privacy filter 604, a ranking engine 606 and a verification module 608.

The request processor 602 can manage transfer of requests and responses. For example, the request processor 602 can receive a request from a client device and redirect the request to the backend server for processing. The full privacy filter 604 includes filter logic for performing a full privacy check of data items that have already passed through an initial privacy filter at the backend server. Performing a full privacy check of data items includes evaluating the data items using a set of privacy policies and rules and determining, based on the evaluation, whether any of the data items should be provided to a viewer. The full privacy filter 604 automatically filters out data items that do not pass the full privacy check and returns any remaining data items that do to the viewer. The ranking engine 606 can rank the data items that pass the full privacy check and provide the data items with their ranking information to the viewer for display on a client device. The ranking may be performed in embodiments where data is expected to be displayed in an ordered fashion (e.g., chronologically, according to relevance, or the like).

In some embodiments, the verification module 608 can detect privacy inconsistencies between the frontend and the backend, log those inconsistencies and take a corrective action when triggered. For example, the verification module 608 can detect and log all data items that were incorrectly filtered at the backend and can keep track of such data items using a counter. When the number of incorrectly filtered objects reaches a threshold, an automatic alert can be triggered. In some embodiments, the verification module 608 can trigger the backend server to calculate the privacy values for the incorrectly filtered data items and update the corresponding values on the database if the calculated values do not match the values stored with the data items at the backend. In alternate embodiments, the verification module 608 can calculate the verification values for the incorrectly filtered data items and push the new values to the backend server if the new values and the current values do not match.

Figure 6B:
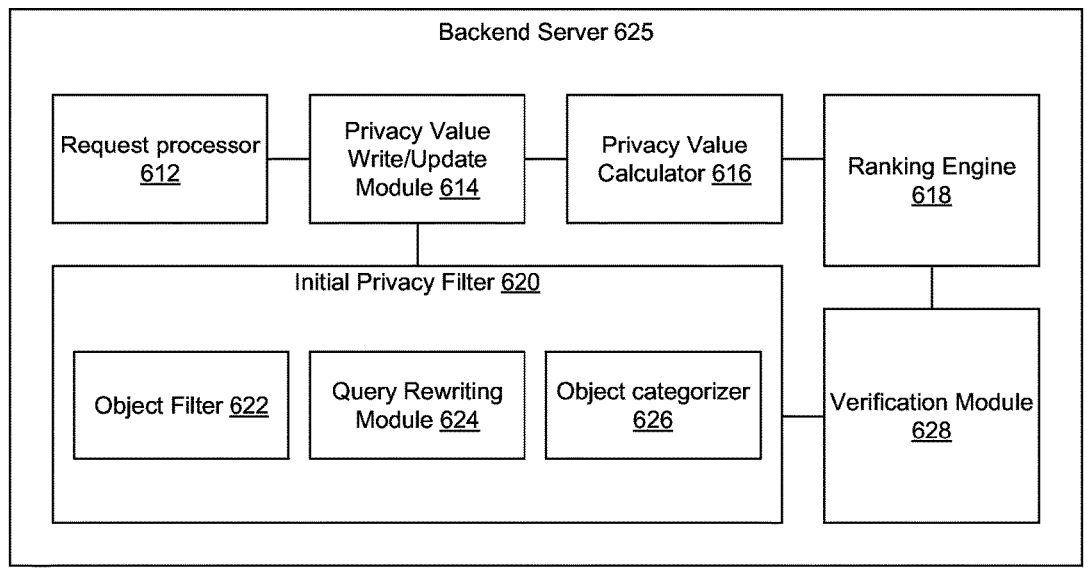
FIG. 6B is a block diagram illustrating example components of a backend server in some embodiments of the multi-level privacy evaluation technology.

FIG. 6B is a block diagram illustrating example components of a backend server 625 in some embodiments of the multi-level privacy evaluation technology. For instance, the backend server 625 can include a request processor 612, a privacy value write/update module 614, a privacy value calculator 616, a ranking engine 618, an initial privacy filter 620 and a verification module 628.

The request processor 612 can coordinate receiving and sending of requests and responses. For example, the request processor 612 can receive requests from the frontend server, parse and/or route requests to modules, aggregate responses from modules and send the responses back to the frontend server. The privacy value write/update module 614 detect creation of new data items and updates to data items that change the data items' privacy. The module 614 can then trigger the privacy value calculator 616 to calculate or update the privacy values for the new or updated data items. The privacy value write/update module and/or the privacy value calculator can be implemented at the frontend server 615 in some embodiments.

The privacy value calculator 616 calculates the privacy value of data items using the privacy libraries. In some embodiments, the privacy value calculator 616 can take as input an identifier of the data items (e.g., status ID, photo ID, video ID, album ID) and return a privacy value of "only me," "friends" or "public" which can be encoded using two bits. In other embodiments, the privacy value calculator 616 can take as input privacy row and tagging information and output a privacy value of "only me," "friends" or "public." The privacy value write/update module 614 can store the privacy values determined by the privacy value calculator 616 in one or more database tables along with the corresponding data items. For example, an privacy value associated with a "status" object can be stored along with the status object in a status object table as illustrated in Table 1 below.

TABLE 1

An example "status" object table

| Name | Type | Description |
| --- | --- | --- |
| comment_info | struct | The comment information of the status being queried |
| like_info | struct | The like information of the status being queried |
| message | string | The content of the status message |
| place_id | id | Facebook ID of the place associated with the status |
| source | id | The application that originally published the status |
| status_id | id | The ID of the status message |
| time | timestamp | UNIX timestamp of the date and time the status message was posted |
| uid | id | The ID of the user who posted the status message |
| privacy_payload | string | The privacy value of the status message |

The initial privacy filter 620 includes filter logic for performing an initial privacy check of data items. Performing an initial privacy check of data items includes evaluating the data items and the privacy values for the data items using a core set of privacy rules and determining, based on the evaluation, whether any of the data items should be provided to a viewer. The initial privacy filter 620 automatically filters out data items that do not pass the initial privacy check and returns any remaining data items that do to the frontend server for full privacy check.

In some embodiments, the initial privacy filter can be implemented as an object filter 622 that examines a data item and determines if the data item should be filtered. The object filter 622 can evaluate a data item's privacy value, owner ID, viewer ID and/or viewer's friends' IDs using a small set of privacy rules to determine whether the data item passes or fails the initial privacy check. Any data item that fails the initial privacy check is filtered out. An example implementation of the logic of the object filter can be substantially similar to:

```
if (object.approx_privacy_value == ONLY_ME &&
object.owner_id == viewer_id) {
    return KEEP;
} else if (object.approx_privacy_value == ONLY_FRIENDS &&
are_friends(object.owner_id, viewer_id)) {
    return KEEP;
}
return FILTER;
```

Figure 7A:
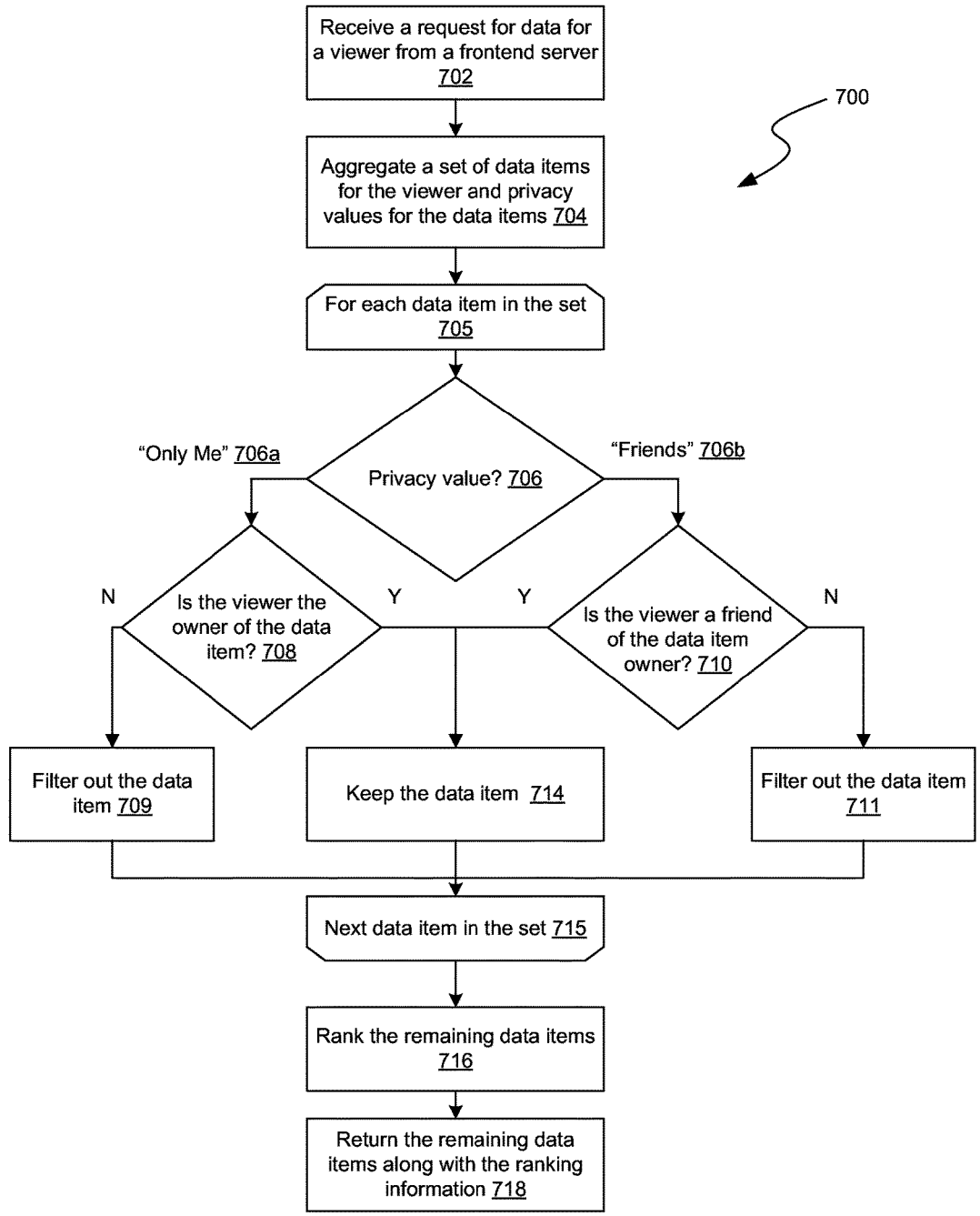
FIG. 7A is a logic flow diagram illustrating an example method of applying an initial privacy check on data items in some embodiments of the multi-level privacy evaluation technology.

An example of a method for evaluating a data item to determine whether the data item should be filtered using the object filter 622 is described in detail in relation to FIG. 7A.

In other embodiments, the initial privacy filter can be implemented as a query rewriting module 624 that rewrites search queries to include privacy value and tagging constraints to filter out data item that would not pass initial privacy checks. For example, a query relating to "posts about Seattle" can be re-written into the following example form by the query rewriting module 624:

```
((about "Seattle") and (privacy == "public") or (about "Seattle")
and (privacy == "friends") and (me, my_friend_1, or my_friend2,
..., or my_friend_n is related to object) of (about "Seattle") and
(privacy == "only_me") and (me is related to object)
```

In the above example query, the user is related to the object if the user is the object's owner or the user is tagged in the object. The privacy value and the taggings used in rewriting the query can be stored in a database (e.g., the search index). In some embodiments, due to performance constraints, the query can be limited to a number of friends (e.g., top 200 friends) of the user. An example method of applying an initial privacy check using the query rewriting module 624 is described in detail in relation to FIG. 8B.

In yet other embodiments, the initial privacy filter can be implemented as an object categorizer 626 that buckets data items based on their privacy values to serve different traffic types. For example, a request from a public stranger to view data items related to a user can be served by data items related to the user stored in the "approximately public" bucket, while a request from a "friend" to view data items related to the user can be served by data items related to the user stored in the "friends-or-less" bucket as well as the "approximately public" bucket. Example methods of using the object categorizer 626 to bucket data items based on their privacy values and serve data items from the buckets for different traffic types are described in detail in relation to FIGS. 9A and 9B.

The ranking engine 618, like the ranking engine 606, can rank data items based on various criteria. The verification module 628 along with the verification module 608 comprises the verification pipeline for the multi-level privacy evaluation technology to detect any incorrectly filtered data items and take a corrective action. In some embodiments, the verification module 628 can be periodically triggered to select a portion of the data items filtered by the initial privacy filter 620 and mark the filtered data items using a flag to indicate that the filtered data items would have been filtered at the backend server and is being sent to be validated. In some embodiments, the verification module 628 can be triggered by the corresponding verification module 608 of the frontend server to check if the privacy values of the incorrectly filtered data items have changed and if so, to update the database to store the updated privacy values with the data items.

FIG. 7A is a logic flow diagram illustrating an example method 700 of applying an initial privacy check on data items in some embodiments of the multi-level privacy evaluation technology.

At block 702, the backend server receives a request for data items for a viewer. The request can be forwarded to the backend server from a frontend server and can include, for example, a viewer ID and/or viewer's friends' IDs. At block 704, the backend server aggregates a set of data items for the viewer (e.g., data items related to the viewer ID, data items related to the viewer's friends' IDs) and privacy values associated with each data item in the set. These data items can include user actions (e.g., comments, likes, etc.) and objects (e.g., statuses, shares, photos, videos, checkins, etc.). The backend server then evaluates privacy of each data item in the set of data items to determine whether to filter the data item or to include the data item into a result set. This evaluation can be implemented in a loop which begins at block 705.

At decision block 706, the backend server determines the audience for a data item by checking the privacy value associated with the data item. If the privacy value for the data item is "only me" 706a (i.e., only the owner of the data item can see the data item), at decision block 708, the backend server determines if the viewer and the data item owner are the same. If the viewer and the data item owner are the same, then the backend server keeps the data item at block 714, otherwise the data item is filtered out at block 709. If the privacy value for the data item is "friends" 706b, the backend server determines if the viewer and the data item owner are "friends" at decision block 710. If so, the backend server keeps the data item at block 714. Conversely, if the data item owner and the viewer are not "friends," the backend server filters out the data item at block 711. The backend server then evaluates the next data item in the set at block 715. After evaluating the privacy of all the data items in the set of data items, the backend server ranks the remaining data items (i.e., the data items that passed the initial privacy check) using a ranking algorithm at block 716. The backend server then returns the data items that passed the initial privacy check along with the ranking information to the frontend server at block 718.

Figure 7B:
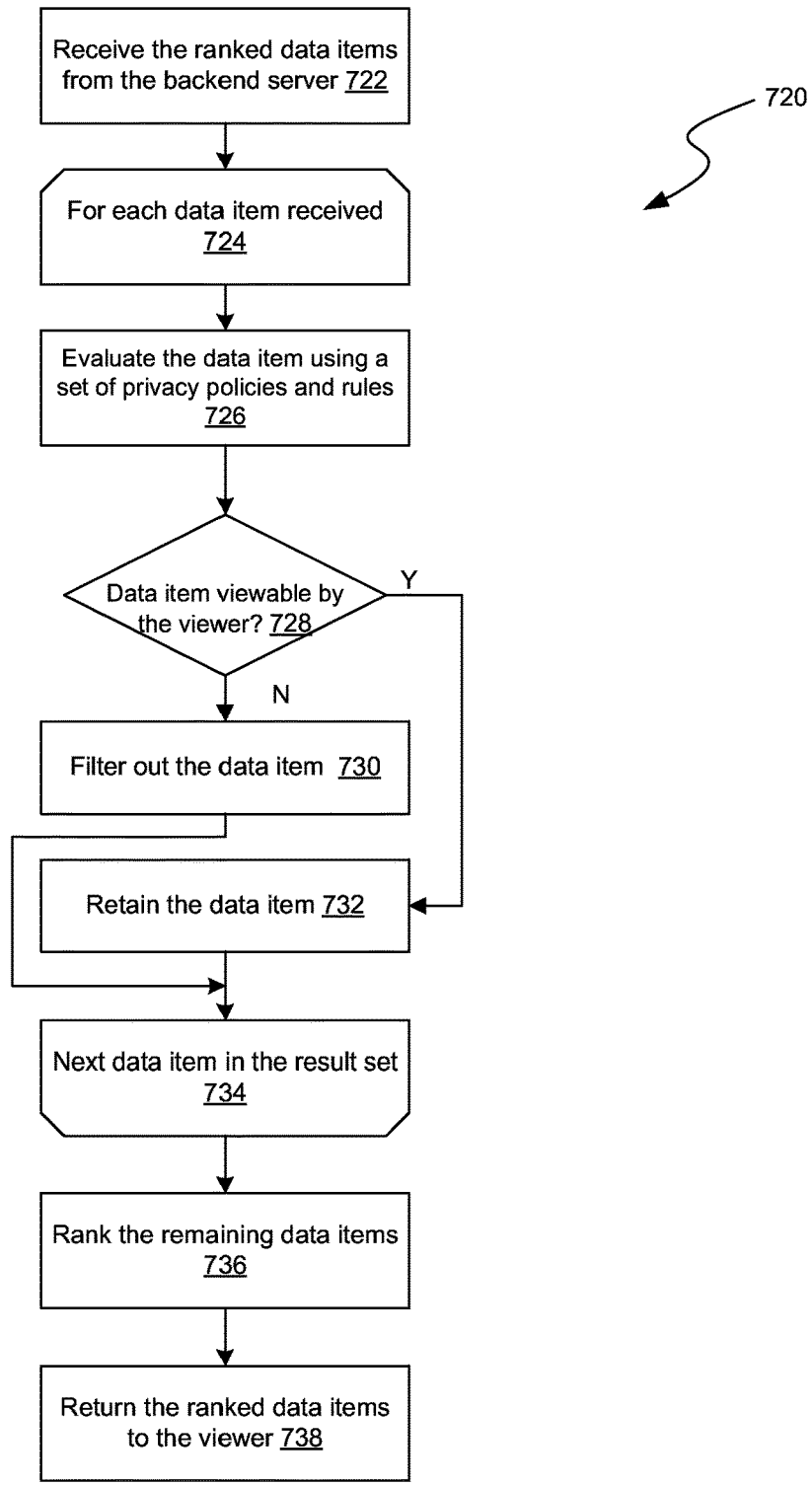
FIG. 7B is a logic flow diagram illustrating an example method of performing a full privacy check on data items returned by the backend server in some embodiments of the multi-level privacy evaluation technology.

FIG. 7B is a logic flow diagram illustrating an example method of performing a full privacy check on data items returned by the backend server in some embodiments of the multi-level privacy evaluation technology. The method 720 starts with the frontend server receiving the ranked data items for the viewer from the backend server at block 722. The frontend server then evaluates each of the data items in a loop by applying a full privacy check to determine whether to filter the data item or to keep the data item. The loop begins at block 724 with the frontend server applying a set of privacy policies and rules to a data item from the received data items at block 726. At decision block 728, the frontend server determines if the data item is viewable by the viewer based on the evaluation of the set of privacy policies and rules. If the data item is viewable, the frontend server retains the data item at block 732. Conversely, if the data item is determined to not viewable by the viewer, the frontend server filters out the data item at block 730. At block 734, the loop continues with the evaluation of the next data item. Once all the data items that were received from the backend server have been evaluated, the loop exits, and at block 736, the frontend server ranks the remaining data items that were not filtered out. At block 738, the ranked data items that the viewer is allowed to see are returned to the viewer's client device for display.

Figure 7C:
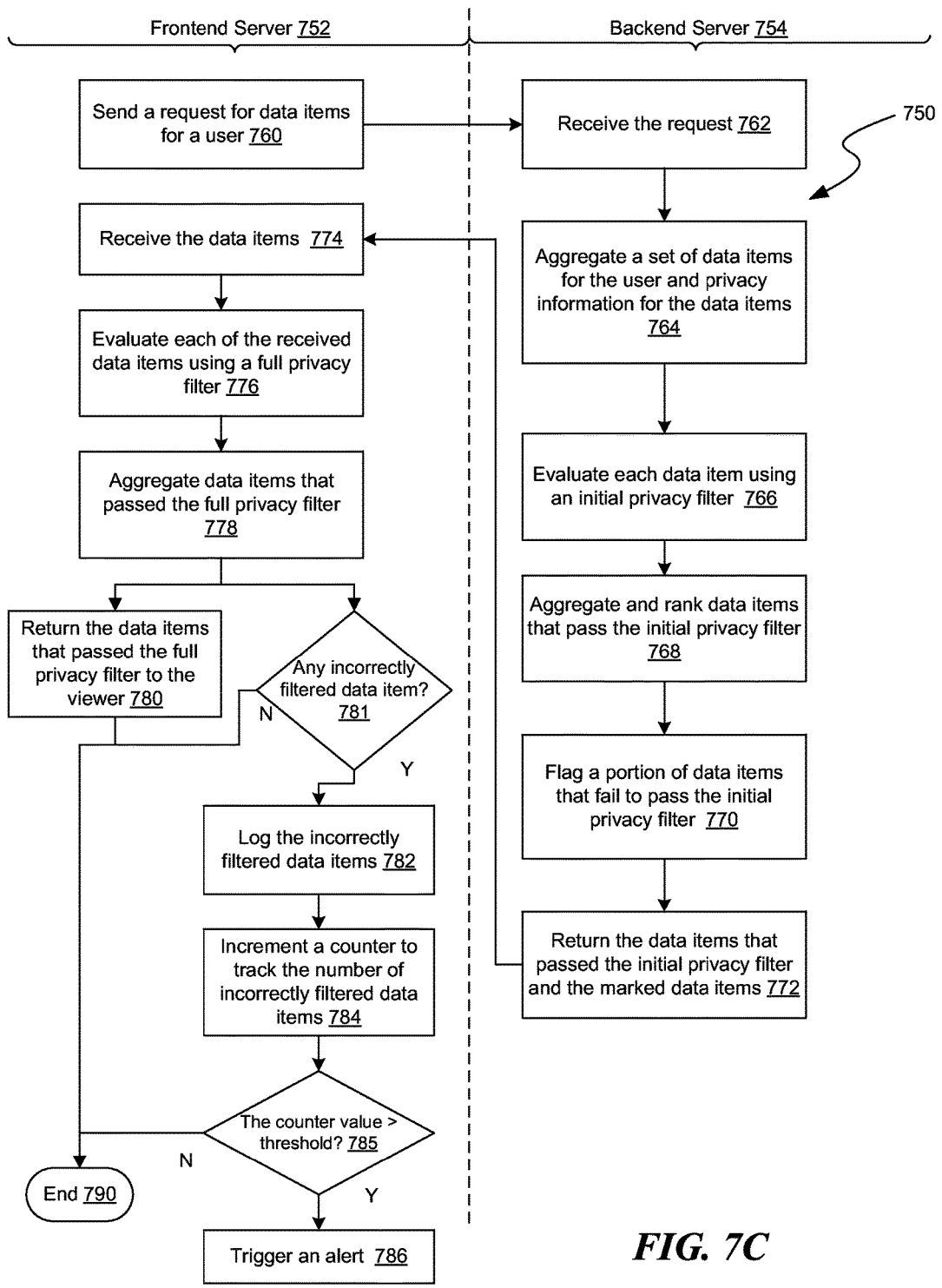
FIG. 7C is a logic flow diagram illustrating an example method of validating an initial privacy check in some embodiments of the multi-level privacy evaluation technology.

In some embodiments, due to changes in the rules, changes in the relationship between users (e.g., two users are no longer friends) or other reasons, the backend server may filter some data items that should have been sent to the frontend server. The multi-level privacy evaluation technology can periodically validate the filtering at the backend to detect and track instances of over filtering occurring at the backend server and take a corrective action. FIG. 7C is a logic flow diagram illustrating an example method of validating an initial privacy check in some embodiments of the multi-level privacy evaluation technology.

In the method 750, a frontend server 752 sends a request for data items associated with a viewer to a backend server 754 at block 760. The backend server 754 receives the request and can parse the request to extract details of the request (e.g., the viewer ID, the viewer's friends' ID, etc.) at block 762. The backend server 754 then aggregates a set of data items for the viewer and the privacy values associated with the data items at block 764. The backend server 754 evaluates each data item, including privacy value and/or other information associated with the data item using an initial privacy filter at block 766. The initial privacy filter can be a logic based a subset of privacy rules to determine if a data item should be filtered out. At block 768, the backend server 754 aggregates and ranks data items that passed the initial privacy filter. In some embodiments, at block 770, the backend server 754 flags at least some of the data items that did not pass the initial privacy filter as data items to be validated. At block 772, the backend server 754 returns the data items that passed the initial privacy filter along with the flagged data items to the frontend server 752. The flagged data items can be used by the frontend server 752 to check the effectiveness of the filtering on the backend server 754. Filtered data items can be periodically flagged and sent to the frontend server to verify that the backend server is not over-filtering data items.

The frontend server 752 receives the data items that passed the initial privacy filter and the flagged data items at block 774. The frontend server 752 then evaluates each of the received data items using a full privacy filter at block 776. The full privacy filter can check whether any of the data items should be filtered out based on the privacy information including a set of privacy rules. At block 778, the frontend server 752 aggregates data items that passed the full privacy filter and optionally returns the data items to the viewer at block 780. For example, when the validation method is being implemented as a background process, the data items need not be returned to the viewer. At decision block 781, the frontend server 752 examines the data items that passed the full privacy filter to determine if any of those data items include the flagged data items. A flagged data item passing the full privacy check can be an indication that the initial privacy filter incorrectly filtered the data item at the backend. The frontend server 752 logs the incorrectly filtered data items at block 782. The frontend server 752 then increments a counter to track the number of incorrectly filtered data items at block 784. At decision block 785, if the counter value is determined to be greater than a threshold, the frontend server 752 can trigger an alert at block 786. In some instances, the decision block 785 can also check for other criteria such as increment step size (e.g., counter value jumps from 10 to 200) to trigger an alert. The alert can be an indication that some privacy rules have changed elsewhere and the backend server 754 does not have the current information. In some embodiments, when the alert is triggered or when one or more incorrectly filtered data items are encountered, the frontend server 752 can calculate privacy values for the incorrectly filtered data items. The frontend server 752 can then compare the calculated privacy values with the ones stored in the backend. If there is a mismatch, the frontend server 752 can push those values to the backend server 754 to ensure that the backend server 754 has current privacy information for evaluation. Conversely, if there are no incorrectly filtered data items or if the counter value is under the threshold, the method terminates at block 790.

Figure 8A:
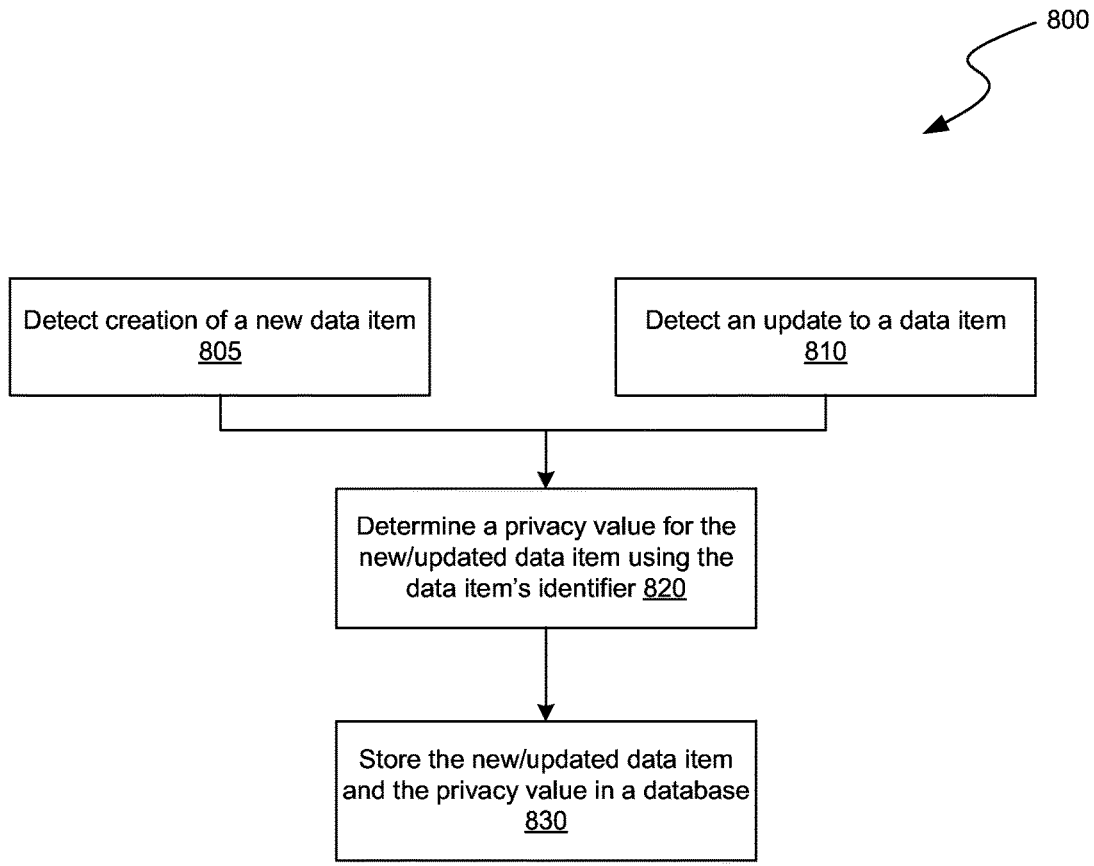
FIG. 8A is a logic flow diagram illustrating an example method of writing and updating privacy information at a backend server in some embodiments of the multi-level privacy evaluation technology

FIG. 8A is a logic flow diagram illustrating an example method 800 of writing and updating privacy information at a backend server in some embodiments of the multi-level privacy evaluation technology. At block 805, the backend server detects creation of a new data item or at block 810, the backend server detects an update to a data item. The update can be a change in the privacy of a data item. Privacy of a data item can change due to tagging or untagging, change in privacy settings or change in the privacy of a related data item. For example, when a photo album's privacy changes from "Only Me" to "Friends," privacy for all photos within that album also changes. Similarly, when a user changes a global setting (e.g., change "who can see posts others wrote on my wall" and "who can see posts I am tagged in" settings in a social networking application), the change can affect the privacy and therefore visibility of all data items controlled by the global setting. By way of another example, when a tag is added to a photo, the privacy of that photo changes due to tag expansion and when a data item is shared, all shares of that data item will need to be updated.

Whenever a new data item or an update to a data item is detected, the backend server calculates or updates the privacy value for the data item. At block 820, the backend server uses an identifier for the new or updated data item and the privacy libraries to determine an privacy value for the new or updated data item. In some embodiments, the backend server can use privacy row and tagging information and the privacy libraries to determine a privacy value of the data item. At block 830, the backend server stores the new/updated data item along with the privacy value in a database.

Figure 8B:
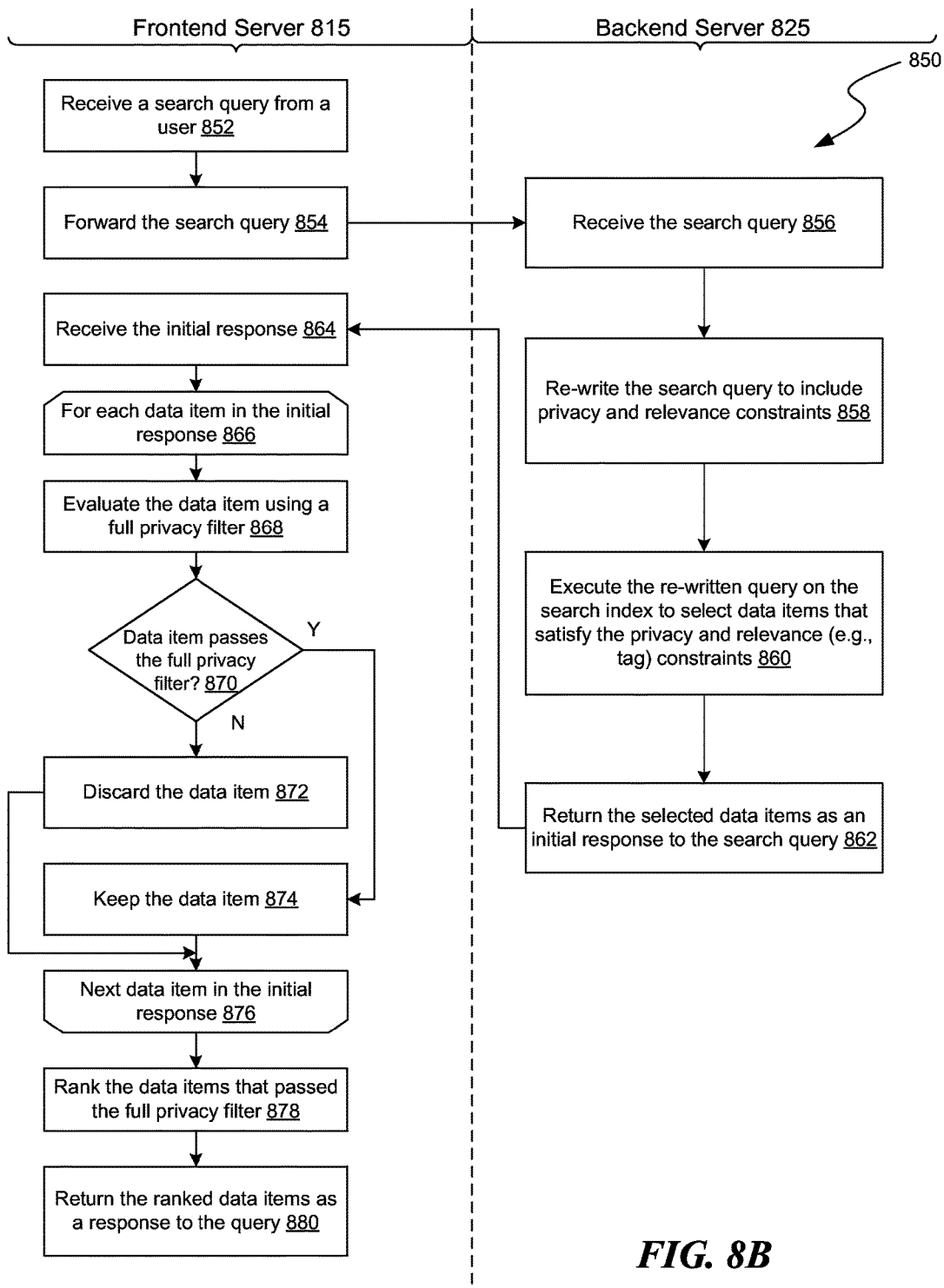
FIG. 8B is a logic flow diagram illustrating an example method of processing a search query in some embodiments of the multi-level privacy evaluation technology.

FIG. 8B is a logic flow diagram illustrating an example method of processing a search query in some embodiments of the multi-level privacy evaluation technology.

In the method 850, at block 852, a frontend server 815 receives a search query from a viewer. The frontend server 815 forwards the search query to a backend server 825 which can be a search engine. The backend server 825 receives the search query at block 856 and rewrites the search query to include privacy and relevance constraints at block 858. For example, if the search query is for finding any data items related to "Grand Canyon," the backend server 825 can modify the search query to search for any data items that satisfies the condition of being related to "Grand Canyon" and any of the following conditions: (1) a privacy value of "public;" (2) a privacy value of "friends"; and (3) a privacy of "only me" where the user is the data item's owner or is tagged in the data item. At block 860, the backend server 825 executes the modified query on a search index (or index server) to select data items that satisfy the relatedness, privacy and tag constraints. The backend server 825 then returns the selected data items as an initial response to the search query at block 862. The frontend server 815 receives the initial response at block 864, and for each data item in the initial response at block 866, the frontend server 815 evaluates the data item using a full privacy filter at block 868. At decision block 870, if the data item passes the full privacy filter, the frontend server 815 keeps the data item at block 874. Conversely, if the data item fails to pass the full privacy check, the frontend server 815 discards the data item at block 872. At block 876, the frontend server 815 evaluates the next data item in the initial response. Once all the data items in the initial response have been evaluated, the frontend server 815 ranks the data items that passed the full privacy filter at block 878 and returns the ranked results as a response to the search query at block 880.

Figure 9A:
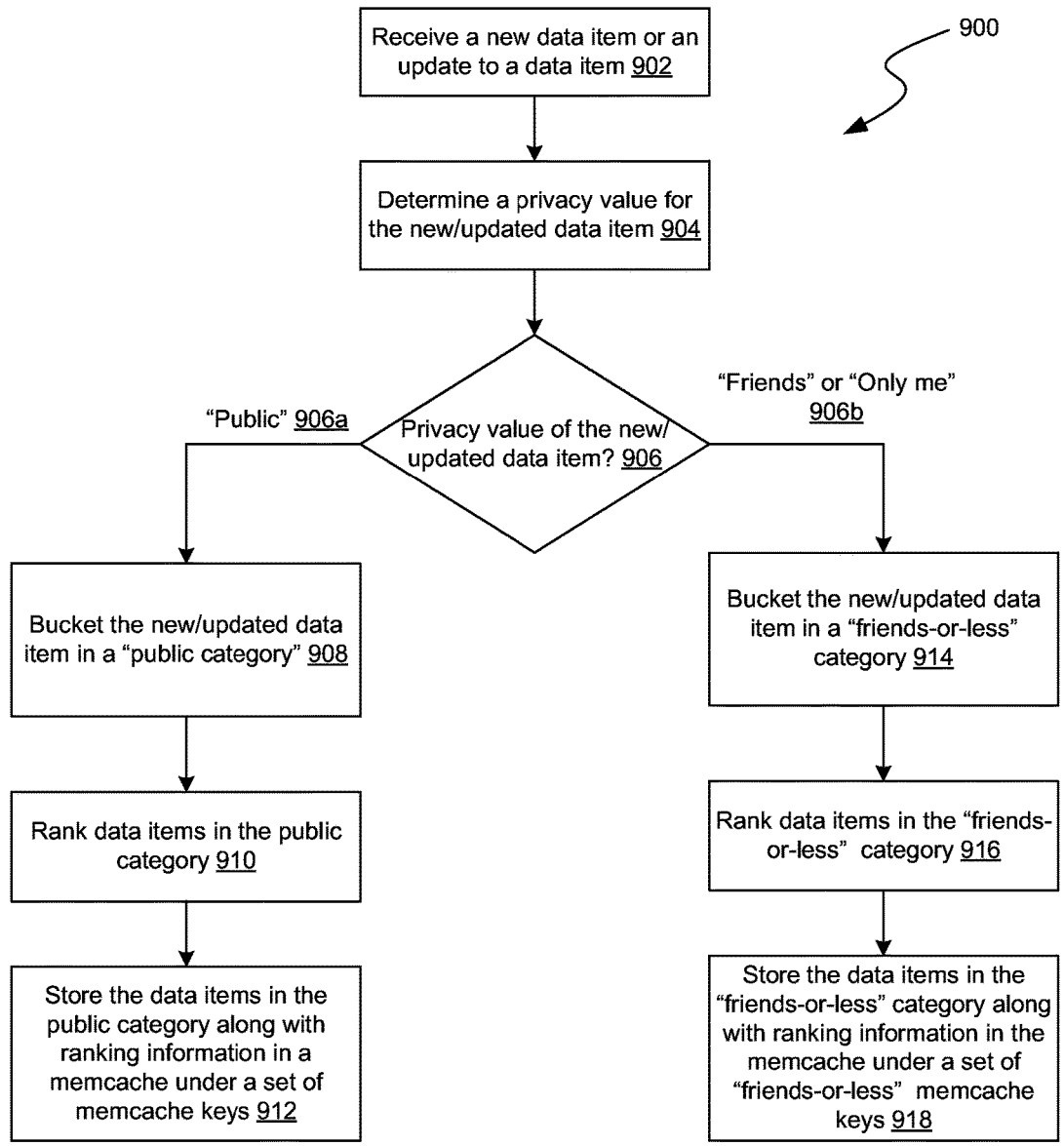
FIG. 9A is a logic flow diagram illustrating an example method of using privacy information to bucket data items into viewer categories in some embodiments of the multi-level privacy evaluation technology.

FIG. 9A is a logic flow diagram illustrating an example method of using privacy information to bucket data items into viewer categories in some embodiments of the multi-level privacy evaluation technology.

In the method 900, at block 902, a backend server receives or detects a new data item or an update to a data item. The backend server determines a privacy value for the new/updated data item using the privacy libraries at block 904. At decision block 906, the backend server determines a category in which the data item should be bucketed based on the privacy value. For example, if the privacy value is "public" 906a, the backend server buckets the new/updated data item in a "public" category at block 908. At block 910, the backend server ranks the data items in the public category and stores the data items along with the ranking information in a memcache under a set of "public" memcache keys.

At decision block 906, if the new/updated data item has a privacy value that is "only me" or "friends" 906b, the backend server buckets the new/updated data item in the "friends-or-less" category at block 914. The backend server then ranks the data items in the "friends-or-less" category at block 916 and stores those data items along with the ranking information in the memcache under a different set of memcache keys at block 918.

In some embodiments, visibility of some of the data items can be controlled by global settings and such information may not be stored with the data items. As a result, the privacy libraries can determine the privacy value of such data items to be "custom" which is treated as "public." Thus, even if the data items are less than "public" (e.g., shared with friends), the data items are treated as public and would not be filtered at the backend. In some embodiments, the backend server can compute the privacy value for the privacy settings using a privacy application programming interface (API). This enables data items having less than public global settings to be filtered at the backend.

Figure 9B:
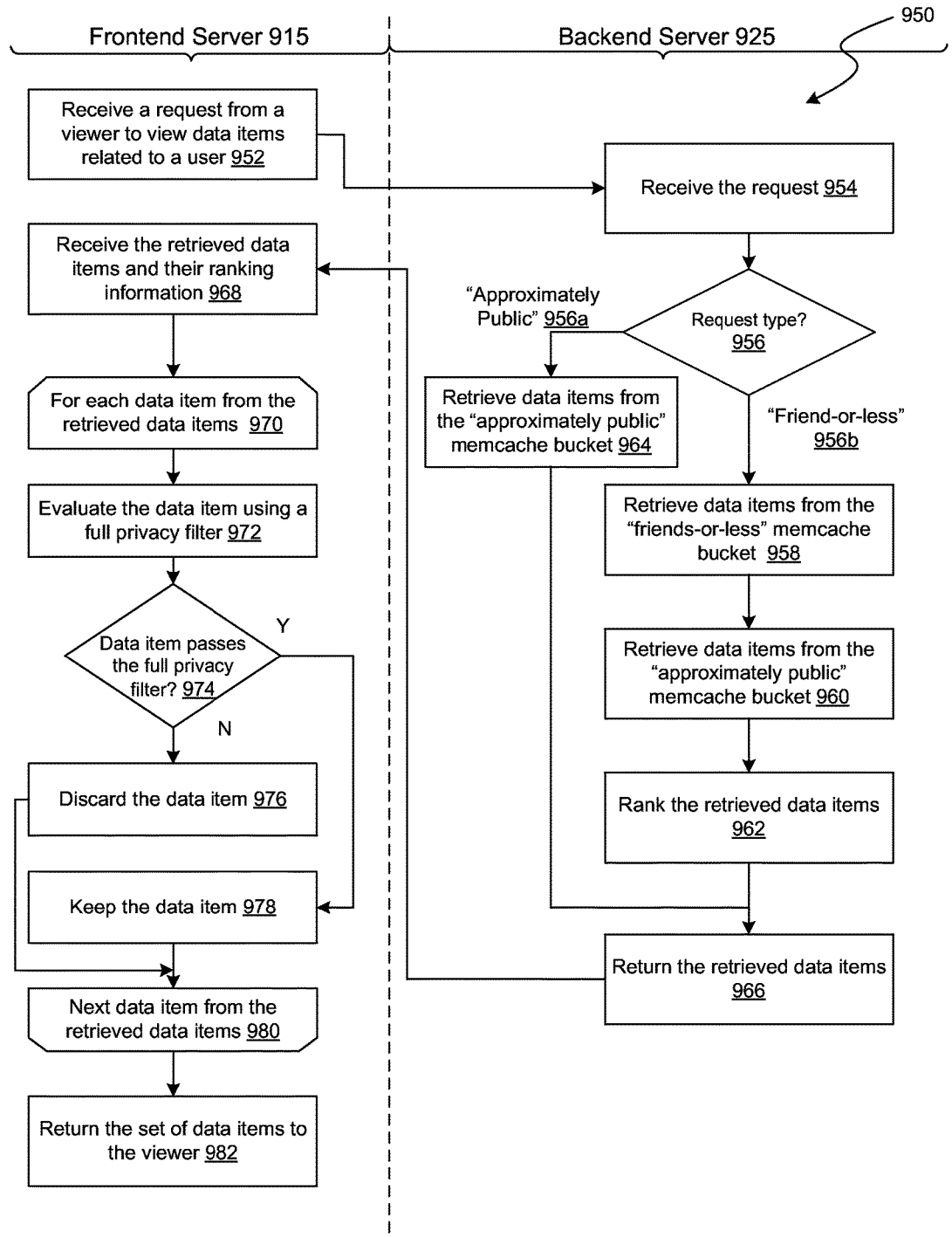
FIG. 9B is a logic flow diagram illustrating an example method of retrieving data items based on viewer categories in some embodiments of the multi-level privacy evaluation technology.

FIG. 9B is a logic flow diagram illustrating an example method of retrieving data items based on viewer categories in some embodiments of the multi-level privacy evaluation technology.

In the method 950, at block 952, a frontend server 915 receives a request from a viewer to view data items related to a user and sends the request to a backend server 925. The backend server 925 receives the request at block 954. The request can include, for example, a viewer ID and user ID. At decision block 956, the backend server 925 can determine is the request corresponds to an "approximately public" type or "friends-or-less" type. If the request is of "approximately public" type 956*a* (e.g., the viewer does not have a "friend" relationship with the user), the backend server 925 retrieves data items stored in the "approximately public" memcache bucket using a set of memcache keys at block 964. The backend server 925 then returns the retrieved data items, along with the ranking information, to the frontend server 915 at block 966.

If at decision block 956, the request type is "friends-or-less" 956*b* (e.g., the viewer has a "friend" relationship with the user or the viewer and the user are the same), the backend server 925 retrieves data items from the "friends-or-less" bucket using a set of memcache keys at block 958 and data items from the "approximately public" memcache bucket using a different set of memcache keys at block 960. The backend server 925 then mixes the retrieved data items and ranks the data items at block 962. The backend server 925 then returns the retrieved data items along with the ranking information to the frontend server 915 at block 966.

The frontend server 915 receives the retrieved data items and the ranking information at block 968. At block 970, for each data item from the retrieved data items, the frontend server 915 evaluates the data item using a full privacy filter at block 972. At decision block 974, if the data item passes the full privacy filter, the frontend server 915 keeps the data item at block 978. Conversely, if the data item fails to pass the full privacy filter, the frontend server 915 discards the data item at block 976. At block 980, the frontend server 915 evaluates the next data item from the retrieved data items. Once all the data items retrieved from the backend have been evaluated, the frontend server 915 returns the results with their ranking information to the viewer at block 982.

Figure 10:
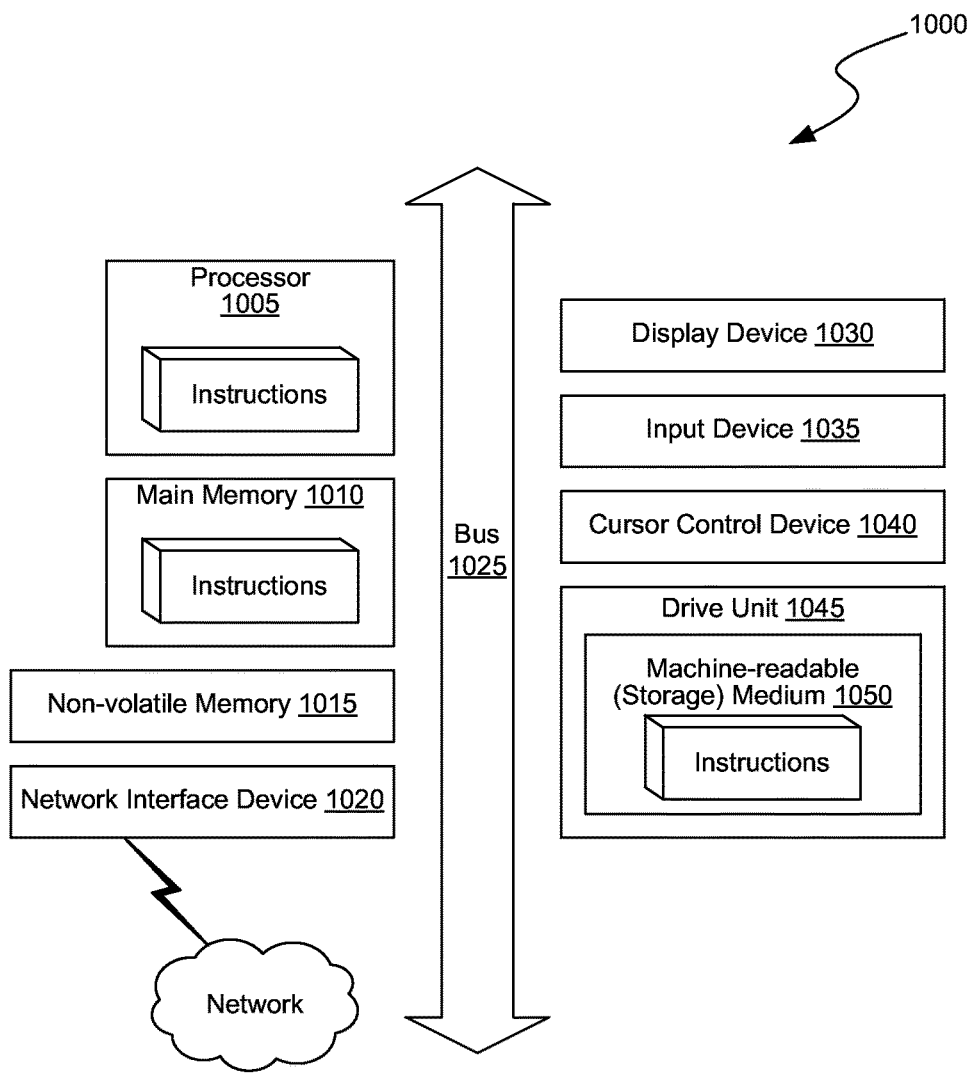
FIG. 10 shows a diagrammatic representation of a computer system within which a set of instructions, for causing the computer system to perform any one or more of the methodologies discussed herein, can be executed.

FIG. 10 shows a diagrammatic representation of a computer system 1000 on which the embodiments of the present disclosure can be implemented. For example, the frontend server (e.g., 145, 215, 315, 415, 515, 615, 752, 815, 915), the backend server (140, 225, 325, 425, 525, 625, 754, 825, 925) and client devices 205A-D can be implemented on the computer system 900.

The computer system 1000 generally includes a processor 1005, main memory 1010, non-volatile memory 1015, and a network interface device 1020. Various common components (e.g., cache memory) are omitted for illustrative simplicity. The computer system 1000 is intended to illustrate a hardware device on which any of the components depicted in the example of FIGS. 1, 2A, 2B and 4 (and any other components described in this specification) and methods described in the example of FIGS. 5-7 can be implemented. The computer system 1000 be of any applicable known or convenient type. The components of the computer system 1000 can be coupled together via a bus 1025 or through some other known or convenient device.

The processor 1005 may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory 1010 is coupled to the processor 1005 by, for example, a bus 1025 such as a PCI bus, SCSI bus, or the like. The memory 1010 can include, by way of example but not limitation, random access memory (RAM), such as dynamic RAM (DRAM) and static RAM (SRAM). The memory 1010 can be local, remote, or distributed.

The bus 1025 also couples the processor 1005 to the non-volatile memory 1015 and drive unit. The non-volatile memory 1015 is often a magnetic floppy or hard disk, a magnetic-optical disk, an optical disk, a read-only memory (ROM), such as a CD-ROM, EPROM, or EEPROM, a magnetic or optical card, SD card, or another form of storage for large amounts of data. Some of this data is often written, by a direct memory access process, into memory during execution of software in the computer system 1000. The non-volatile memory 1015 can be local, remote, or distributed. The non-volatile memory can be optional because systems can be created with all applicable data available in memory. A typical computer system will usually include at least a processor, memory, and a device (e.g., a bus) coupling the memory to the processor.

Software is typically stored in the non-volatile memory 1015 and/or the drive unit 1045. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory 1010 in this disclosure. Even when software is moved to the memory for execution, the processor will typically make use of hardware registers to store values associated with the software, and local cache. Ideally, this serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus 1025 also couples the processor to the network interface device 1020. The interface can include one or more of a modem or network interface. It will be appreciated that a modem or network interface can be considered to be part of the computer system 1000. The interface can include an analog modem, isdn modem, cable modem, token ring interface, satellite transmission interface (e.g., "direct PC"), or other interfaces for coupling a computer system to other computer systems. The interface can include one or more input and/or output devices 1035. The I/O devices can include, by way of example but not limitation, a keyboard, a mouse or other pointing device, disk drives, printers, a scanner, speaker, DVD/CD-ROM drives, disk drives, and other input and/or output devices, including a display device. The display device 1030 can include, by way of example but not limitation, a cathode ray tube (CRT), liquid crystal display (LCD), LED display, a projected display (such as a heads-up display device), a touchscreen or some other applicable known or convenient display device. The display device 1030 can be used to display text and graphics. For simplicity, it is assumed that controllers of any devices not depicted in the example of FIG. 8 reside in the interface.

In operation, the computer system 1000 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile memory 1015 and/or drive unit 1045 and causes the processor to execute the various acts required by the operating system to input and output data and to store data in the memory, including storing files on the non-volatile memory 1015 and/or drive unit 1045.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer (e.g., a database server), a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium 1050 is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), SD cards, among others.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made. Accordingly, the invention is not limited except as by the appended claims.

We claim:

1. A computer-implemented method, comprising:
    detecting an action corresponding to creation of or updating of multiple data items;
    computing privacy values of the multiple data items;
    evaluating the privacy values of the multiple data items to store the multiple data items into different categories;
    receiving a request initiated by a viewer to view a set of data items related to a user; and
    applying, in response to the request, a privacy check on the set of data items to filter out data items that the viewer is not permitted to view by selecting at least one of the different categories as a source for retrieving the set of data items;
    receiving, at a front end server and from a backend server, at least one data item of the set of data items that failed an initial privacy check for validation;
    applying, at the front end server, a final privacy check based on a second set of privacy rules to the at least one data item to determine whether the at least one data item passes or fails the final privacy check; and
    identifying, at the front end server, the at least one data item as an incorrectly filtered data item when the at least one data item passes the final privacy check.

2. The computer-implemented method of claim 1, wherein the different categories include:
    an approximately public category that includes data items viewable by any public viewer; and
    a friends or less category that includes data items viewable by a viewer who has a friend relationship with the user.

3. The computer-implemented method of claim 2, wherein when the viewer associated with the request is a public viewer, the data items are retrieved from the approximately public category.

4. The computer-implemented method of claim 2, wherein when the viewer associated with the request has a friend relationship with the user, and wherein the data items are retrieved from both the approximately public category and the friends or less category.

5. The computer-implemented method of claim 1, wherein applying the privacy check includes:
    applying, at a backend server, an initial privacy policy check to determine at least some of the set of data items that satisfy a first set of privacy rules; and
    transmitting the at least some of the set of data items to the frontend server for displaying to the viewer.

6. The computer-implemented method of claim 5 further comprising:
    applying, at the front end server, a final privacy check based on a second set of privacy rules to filter out data items from the at least some of the set of data items that the viewer is not allowed to view to generate a selected set of data items; and
    outputting the selected set of data items to the viewer.

7. The computer-implemented method of claim 6, wherein the first set of privacy rules is a subset of the second set of privacy rules.

8. The computer-implemented method of claim 1, wherein computing the privacy values includes encoding a privacy value of the privacy values using two bits.

9. The computer-implemented method of claim 1 further comprising:
   tracking a number of incorrectly filtered data items using a counter; and
   triggering an alert to take a corrective action when the number of incorrectly filtered data items exceeds a threshold.

10. A non-transitory computer-readable storage medium storing computer-readable instructions, comprising:
   instructions for detecting an action corresponding to creation of or updating of multiple data items;
   instructions for computing privacy values of the multiple data items;
   instructions for evaluating the privacy values of the multiple data items to store each of the multiple data items into a first category or a second category, wherein the second category is more restrictive than the first category;
   instructions for receiving a request initiated by a viewer to view a set of data items related to a user; and
   instructions for applying, in response to the request, a privacy check on the set of data items to filter out data items that the viewer is not permitted to view by selecting at least one of the first category or the second category as a source for retrieving the set of data items;
   instructions for receiving, at a front end server and from a backend server, at least one data item of the set of data items that failed an initial privacy check for validation;
   instructions for applying, at the front end server, a final privacy check based on a second set of privacy rules to the at least one data item to determine whether the at least one data item passes or fails the final privacy check; and
   instructions for identifying, at the front end server, the at least one data item as an incorrectly filtered data item when the at least one data item passes the final privacy check.

11. The non-transitory computer-readable storage medium of claim 10, wherein the instructions for evaluating the privacy values include:
   instructions for organizing a first specified data item of the data items having a privacy value that indicates that the first specified data item is viewable by any public viewer into the first category; and
   instructions for organizing a second specified data item of the data items having a privacy value that indicates that the second specified data item is viewable by a viewer who has a friend relationship with the user into the second category.

12. The non-transitory computer-readable storage medium of claim 10, wherein the instructions for receiving the request include instructions for receiving the request from a viewer who is a public viewer.

13. The non-transitory computer-readable storage medium of claim 12, wherein the instructions for applying the privacy check include:
   instructions for retrieving a subset of the set of data items organized into the first category;
   instructions for applying the privacy check on the subset of the set of data items to filter out data items that the viewer is not permitted to view; and
   instructions for outputting the remaining data items to the viewer.

14. The non-transitory computer-readable storage medium of claim 10, wherein the instructions for applying the privacy check include:
   instructions for applying, at a backend server, an initial privacy check to determine at least some of the set of data items that satisfy a first set of privacy rules; and
   instructions for transmitting the at least some of the set of data items to a frontend server for displaying to the viewer.

15. The non-transitory computer-readable storage medium of claim 14 further comprising:
   instructions for applying, at the front end server, a final privacy check based on a second set of privacy rules to filter out data items from the at least some of the set of data items that the viewer is not allowed to view to generate a selected set of data items; and
   instructions for outputting the selected set of data items to the viewer.

16. The non-transitory computer-readable storage medium of claim 15, wherein the first set of privacy rules is a subset of the second set of privacy rules.

17. The non-transitory computer-readable storage medium of claim 10, wherein the instructions for computing the privacy values include instructions for encoding a privacy value of the privacy values using two bits.

18. A system, comprising:
   means for detecting an action corresponding to creation of or updating of multiple data items;
   means for computing privacy values of the multiple data items;
   means for evaluating the privacy values of the multiple data items to organize store the multiple data items into different categories;
   means for receiving a request initiated by a viewer to view a set of data items related to a user;
   means for applying, in response to the request, a privacy check on the set of data items to filter out data items that the viewer is not permitted to view by selecting at least one of the different categories as a source for retrieving the set of data items;
   means for receiving, at a front end server and from a backend server, at least one data item of the set of data items that failed an initial privacy check for validation;
   means for applying, at the front end server, a final privacy check based on a second set of privacy rules to the at least one data item to determine whether the at least one data item passes or fails the final privacy check; and
   means for identifying, at the front end server, the at least one data item as an incorrectly filtered data item when the at least one data item passes the final privacy check.

19. A system comprising: one or more processors; and a non-transitory memory coupled to the processors comprising instructions executable by the processors, the processors operable when executing the instructions to:
   detect an action corresponding to creation of or updating of multiple data items;
   compute privacy values of the multiple data items;
   evaluate the privacy values of the multiple data items to store the multiple data items into different categories;
   receive a request initiated by a viewer to view a set of data items related to a user; and
   apply, in response to the request, a privacy check on the set of data items to filter out data items that the viewer is not permitted to view by selecting at least one of the different categories as a source for retrieving the set of data items;

receive, at a front end server and from a backend server, at least one data item of the set of data items that failed an initial privacy check for validation;

apply, at the front end server, a final privacy check based on a second set of privacy rules to the at least one data item to determine whether the at least one data item passes or fails the final privacy check; and identify, at the front end server, the at least one data item as an incorrectly filtered data item when the at least one data item passes the final privacy check.

\* \* \* \* \*